US005850369A

United States Patent [19]

Rorden et al.

[11] Patent Number: 5,850,369

[45] Date of Patent: *Dec. 15, 1998

[54] METHOD AND APPARATUS FOR COMMUNICATING DATA IN A WELLBORE AND FOR DETECTING THE INFLUX OF GAS

[75] Inventors: Louis H. Rorden, Los Altos; Ashok Patel, San Jose, both of Calif.; James V. Leggett, III; Frank Lindsay Gibbons, both of Houston, Tex.; Steven C. Owens, Katy, Tex.

[73] Assignee: Baker Hughes Incorporated, Houston, Tex.

[ * ] Notice: The term of this patent shall not extend beyond the expiration date of Pat. No. 5,592,438.

[21] Appl. No.: 779,300

[22] Filed: Jan. 6, 1997

Related U.S. Application Data

[63] Continuation of Ser. No. 108,958, Aug. 18, 1993, Pat. No. 5,592,438.

[51] Int. Cl.[6] .......................................................... G01V 1/40

[52] U.S. Cl. ......................... 367/83; 340/854.3; 340/854.4

[58] Field of Search .................... 367/82, 83; 340/854.3, 340/854.4

[56] References Cited

U.S. PATENT DOCUMENTS

| | | |
|---|---|---|
| 2,354,887 | 8/1944 | Silverman et al. . |
| 2,388,141 | 10/1945 | Harrington . |
| 2,411,696 | 11/1946 | Silverman et al. . |
| 3,150,346 | 9/1964 | Polly et al. . |
| 3,233,674 | 2/1966 | Leutwyler . |
| 3,305,825 | 2/1967 | Godbey . |
| 3,496,533 | 2/1970 | Semmelink . |
| 3,665,955 | 5/1972 | Conner, Sr. . |
| 3,688,029 | 8/1972 | Bartoe, Jr. et al. . |

(List continued on next page.)

FOREIGN PATENT DOCUMENTS

| | | |
|---|---|---|
| 2 004 204 | 5/1991 | Canada . |
| 0 074 848 | 3/1983 | European Pat. Off. . |
| 0 377 378 | 11/1990 | European Pat. Off. . |
| 0 457 650 A2 | 5/1991 | European Pat. Off. . |

(List continued on next page.)

*Primary Examiner*—Ian J. Lobo
*Attorney, Agent, or Firm*—Melvin A. Hunn

[57] ABSTRACT

A transducer is described especially for use in providing acoustic transmission in a borehole. The transducer includes a multiple number of magnetic circuit gaps and electrical windings that have been found to provide the power necessary for acoustic operation in a borehole while still meeting the stringent dimensional criteria necessitated by boreholes. Various embodiments conforming to the design are described. Moreover, the invention includes transition and reflector sections, as well as a directional coupler and resonator arrangement particularly adapted for borehole acoustic communication.

An acoustic communication system is described especially designed for use in providing acoustic transmission of information in a borehole. The communication system comprises a surface transceiver and at least one downhole transceiver. The surface transceiver operates in conjunction with a host computer that sends commands to the downhole transceiver. Subsequently, the downhole transceiver transmits encoded data from subsurface, borehole sensors to the surface transceiver. The preferred embodiment uses Minimum Shift Keying (MSK) modulation for both transmitting commands to the downhole unit and for transmitting data to the surface transceiver. To facilitate operation of a coherent communication system in the inhospitable environment of a borehole, the acoustic channel is characterized to enable the system to choose the best possible frequency and bandwidth for communication transmission. Additionally, the system achieves synchronous operation by transmitting synchronization signals between the downhole transceiver and the surface transceiver prior to the units exchanging commands and data.

43 Claims, 20 Drawing Sheets

U.S. PATENT DOCUMENTS

| | | | |
|---|---|---|---|
| 3,737,845 | 6/1973 | Maroney et al. . | |
| 3,750,096 | 7/1973 | Koomey et al. . | |
| 3,790,930 | 2/1974 | Lamel et al. . | |
| 3,800,277 | 3/1974 | Patton et al. . | |
| 3,930,220 | 12/1975 | Shawhan . | |
| 3,949,354 | 4/1976 | Claycomb . | |
| 3,958,217 | 5/1976 | Spinnier . | |
| 3,961,308 | 6/1976 | Parker . | |
| 3,964,556 | 6/1976 | Gearhart et al. . | |
| 3,991,611 | 11/1976 | Marshall, III et al. . | |
| 4,038,632 | 7/1977 | Parker . | |
| 4,057,781 | 11/1977 | Scherbatskoy . | |
| 4,073,341 | 2/1978 | Parker . | |
| 4,129,184 | 12/1978 | Parker . | |
| 4,147,222 | 4/1979 | Patten et al. . | |
| 4,166,979 | 9/1979 | Waggener . | |
| 4,181,014 | 1/1980 | Zuvela et al. . | |
| 4,215,425 | 7/1980 | Waggener . | |
| 4,246,964 | 1/1981 | Brandell . | |
| 4,254,481 | 3/1981 | Smither et al. . | |
| 4,273,212 | 6/1981 | Dorr et al. . | |
| 4,293,936 | 10/1981 | Cox et al. . | |
| 4,293,937 | 10/1981 | Sharp et al. . | |
| 4,298,970 | 11/1981 | Shawhan et al. . | |
| 4,314,365 | 2/1982 | Petersen et al. . | |
| 4,320,473 | 3/1982 | Smither et al. . | |
| 4,373,582 | 2/1983 | Bednar et al. . | |
| 4,562,559 | 12/1985 | Sharp et al. . | |
| 4,578,675 | 3/1986 | MacLeod . | |
| 4,669,068 | 5/1987 | Klatt . | |
| 4,689,775 | 8/1987 | Scherbatskoy . | |
| 4,733,233 | 3/1988 | Grosso et al. | 367/82 |
| 4,787,093 | 11/1988 | Rorden . | |
| 4,839,644 | 6/1989 | Safinya et al. . | |
| 4,862,991 | 9/1989 | Hoyle et al. . | |
| 4,908,804 | 3/1990 | Rorden . | |
| 4,971,160 | 11/1990 | Upchurch . | |
| 5,055,837 | 10/1991 | Abdallah et al. . | |
| 5,065,825 | 11/1991 | Bardin et al. . | |
| 5,067,114 | 11/1991 | Rorden et al. . | |
| 5,113,379 | 5/1992 | Scherbatskoy . | |
| 5,124,953 | 6/1992 | Grosso . | |
| 5,148,408 | 9/1992 | Matthews . | |
| 5,163,029 | 11/1992 | Bryant et al. | 367/83 |
| 5,191,326 | 3/1993 | Montgomery . | |
| 5,197,041 | 3/1993 | Balogh . | |
| 5,222,048 | 6/1993 | Grosso et al. . | |
| 5,274,606 | 12/1993 | Drumheller et al. | 367/82 |
| 5,275,040 | 1/1994 | Codazzi | 367/83 |
| 5,283,768 | 2/1994 | Rorden | 367/83 |
| 5,592,438 | 1/1997 | Rorden et al. | 367/83 |

FOREIGN PATENT DOCUMENTS

| | | |
|---|---|---|
| 0 466 229 A1 | 6/1991 | European Pat. Off. . |
| 0 588 391 A | 3/1994 | European Pat. Off. . |
| 0 597 704 A1 | 5/1994 | European Pat. Off. . |
| 2 679 681 | 6/1992 | France . |
| 1 193 475 | 7/1967 | United Kingdom . |
| 1 328 558 | 11/1970 | United Kingdom . |
| 1 540 479 | 2/1979 | United Kingdom . |
| 2 015 307 | 5/1979 | United Kingdom . |
| 1 592 995 | 7/1981 | United Kingdom . |
| 2 123 458 | 1/1984 | United Kingdom . |
| 2 142 453 | 1/1985 | United Kingdom . |
| 2 249 571 | 11/1991 | United Kingdom . |
| 2 247 905 | 3/1992 | United Kingdom . |
| 2 256 736 | 12/1992 | United Kingdom . |
| 2 281 424 | 3/1995 | United Kingdom . |
| 2 203 722 | 2/1997 | United Kingdom . |

METHOD AND APPARATUS FOR COMMUNICATING DATA IN A WELLBORE AND FOR DETECTING THE INFLUX OF GAS

This application is a continuation, of application Ser. No. 08/108,958, filed Aug. 18, 1993 now U.S. Pat. No. 5,592,438.

CROSS-REFERENCE TO RELATED APPLICATION

The present application is related to U.S. Pat. No. 5,283,768, entitled "Borehole Liquid Acoustic Wave Transducer", filed Jun. 14, 1991 and assigned to the assignee herein, and incorporated by reference herein.

BACKGROUND OF THE INVENTION

1. Field of the Invention

The present invention relates to:

(a) a transducer which may be utilized to transmit and receive data in a wellbore;

(b) a communication system for improving the communication of data in a wellbore;

(c) one application of the transducer in a measurement-while-drilling system; and (4) one application of the transducer and communication system to detect gas influx in a wellbore.

2. Background of the Invention

One of the more difficult problems associated with any borehole is to communicate intelligence between one or more locations down a borehole and the surface, or between downhole locations themselves. For example, communication is desired by the oil industry to retrieve, at the surface, data generated downhole during drilling operations, including during quiescent periods interspersing actual drilling procedures or while tripping; during completion operations such as perforating, fracturing, and drill stem or well testing; and during production operations such as reservoir evaluation testing, pressure and temperature monitoring. Communication is also desired in such industry to transmit intelligence from the surface to downhole tools or instruments to effect, control or modify operations or parameters.

Accurate and reliable downhole communication is particularly important when data (intelligence) is to be communicated. This intelligence often is in the form of an encoded digital signal.

One approach has been widely considered for borehole communication is to use a direct wire connection between the surface and the downhole location(s). Communication then can be via electrical signal through the wire. While much effort has been expended toward "wireline" communication, this approach has not been adopted commercially because it has been found to be quite costly and unreliable. For example, one difficulty with this approach is that since the wire is often laid via numerous lengths of a drill stem or production tubing, it is not unusual for there to be a break or a poor wire connection which arises at the time the wire assembly is first installed. While it has been proposed (see U.S. Pat. No. 4,215,426) to avoid the problems associated with direct electrical coupling of drill stems by providing inductive coupling for the communication link at such location, inductive coupling has as a problem, among others, major signal loss at every coupling. It also relies on installation of special and complex drillstring arrangements.

Another borehole communication technique that has been explored is the transmission of acoustic waves. Such physical waves need a transmission medium that will propagate the same. It will be recognized that matters such as variations in earth strata, density make-up, etc., render the earth completely inappropriate for an acoustic communication transmission medium. Because of these known problems, those in the art generally have confined themselves to exploring acoustic communication through borehole related media.

Much effort has been expended toward developing an appropriate acoustic communication system in which the borehole drill stem or production tubing itself acts as the transmission medium. A major problem associated with such arrangements is caused by the fact that the configurations of drill stems or production tubing generally vary significantly lengthwise. These variations typically are different in each hole. Moreover, a configuration in a particular borehole may vary over time because, for example, of the addition of tubing and tools to the string. The result is that there is no general usage system relying on drill stem or production tubing transmission that has gained meaningful market acceptance.

Efforts have also been made to utilize liquid within a borehole as the acoustic transmission medium. At first blush, one would think that use of a liquid as the transmission medium in a borehole would be relatively simple approach, in view of the wide usage and significant developments that have been made for communication and sonar systems relying on acoustic transmission within the ocean.

Acoustic transmission via a liquid within a borehole is considerably different than acoustic transmission within an open ocean because of the problems associated with the boundaries between the liquid and its confining structures in a borehole. Criteria relating to these problems are of paramount importance. However, because of the attractiveness of the concept of acoustic transmission in a liquid independent of movement thereof, a system was proposed in U.S. Pat. No. 3,964,556 utilizing pressure changes in a non-moving liquid to communicate. Such system has not been found practical, however, since it is not a self-contained system and some movement of the liquid has been found necessary to transmit pressure changes.

In light of the above, meaningful communication of intelligence via borehole liquids has been limited to systems which rely on flow of the liquid to carry on acoustic modulation from a transmission point to a receiver. This approach is generally referred to in the art as MWD (measure while drilling). Developments relating to it have been limited to communication during the drilling phase in the life of a borehole, principally since it is only during drilling that one can be assured of fluid which can be modulated flowing between the drilling location and the surface. Most MWD systems are also constrained because of the drilling operation itself. For example, it is not unusual that the drilling operation must be stopped during communication to avoid the noise associated with such drilling. Moreover, communication during tripping is impossible.

In spite of the problems with MWD communication, much research has been done on the same in view of the desirability of good borehole communication. The result has been an extensive number of patents relating to MWD, many of which are directed to proposed solutions to the various problems that have been encountered. U.S. Pat. No. 4,215,426 describes an arrangement in which power (rather than communication) is transmitted downhole through fluid modulation akin to MWD communication, a portion of which power is drained off at various locations downhole to power repeaters in a wireline communication transmission system.

The development of communication using acoustic waves propagating through non-flowing fluids in a borehole has been impeded by lack of a suitable transducer. To be practical for a borehole application, such a transducer has to fit in a pressure barrel with an outer diameter of no more than 1.25 inches, operate at temperatures up to 150° C. and pressures up to 1000 bar, and survive the working environment of handling and running in a well. Such a transducer would also have to take into consideration the significant differences between communication in a non-constrained fluid environment, such as the ocean, and a confined fluid arrangement, such as in a borehole.

The development of reliable communication using acoustic waves propagating through non-flowing fluids in a borehole has been impeded by the fact that the borehole environment is extremely noisy. Moreover, to be practical, an acoustic communication system using non-flowing liquid is required to be highly adaptive to variations in the borehole channel and must provide robust and reliable throughput of data in spite of such variations.

SUMMARY OF THE INVENTION

The Transducer:

The present invention relates to a practical borehole acoustic communication transducer. It is capable of generating, or responding to, acoustic waves in a viscous liquid confined in a borehole. Its design takes into consideration the waveguide nature of a borehole. It has been found that, to be practical, a borehole acoustic transducer has to generate, or respond to, acoustic waves at frequencies below one kilohertz with bandwidths of tens of Hertz, efficiently in various liquids. It has to be able to do so while providing high displacement and having a lower mechanical impedance than conventional open ocean devices. The transducer of the invention meets these criteria as well as the size and operating criteria mentioned above.

The transducer of the invention has many features that contribute to its capability. It is similar to a moving coil loudspeaker in that movement of an electric winding relative to magnetic flux in the gap of a magnetic circuit is used to convert between electric power and mechanical motion. It uses the same interaction for transmitting and receiving. A dominant feature of the transducer of the invention is that a plurality of gaps are used with a corresponding number (and placement) of electrical windings. This facilitates developing, with such a small diameter arrangement, the forces and displacements found to be necessary to transduce the low frequency waves required for adequate transmission through non-flowing viscous fluid confined in a borehole. Moreover, a resonator may be included as part of the transducer if desired to provide a compliant backload.

The invention includes several arrangements responsible for assuring that there is good borehole transmission of acoustic waves. For one, a transition section is included to provide acoustic impedance matching in the borehole liquid between sections of the borehole having significantly different cross-sectional areas such as between the section of the borehole having the transducer and any adjacent borehole section. Reference throughout this patent specification to a "cross-sectional" area is reference to the cross-sectional area of the transmission (communication channel.) For another, a directional coupler arrangement is described which is at least partially responsible for inhibiting transmission opposite to the direction in the borehole of the desired communication. Specifically, a reflection section is defined in the borehole, which section is spaced generally an odd number of quarter wavelengths from the transducer and positioned in a direction opposite that desired for the communication, to reflect back in the proper communication direction, any acoustic waves received by the same which are being propagated in the wrong direction. Most desirably, a multiple number of reflection sections meeting this criteria are provided as will be described in detail.

A special bidirectional coupler based on back-loading of the transducer piston also can be provided for this purpose. Most desirably, the borehole acoustic communication transducer of the invention has a chamber defining a compliant back-load for the piston, through which a window extends that is spaced from the location at which the remainder of the transducer interacts with borehole liquid by generally an odd number of quarter wavelengths of the nominal frequency of the central wavelength of potential communication waves at the locations of said window and the point of interaction.

Other features and advantages of the invention will be disclosed or will become apparent from the following more detailed description. While such description includes many variations which occurred to Applicant, it will be recognized that the coverage afforded Applicant is not limited to such variations. In other words, the presentation is supposed to be exemplary, rather than exhaustive.

The Communication System:

The present invention relates to a practical borehole acoustic communication system. It is capable of communicating in both flowing and non-flowing viscous liquids confined in a borehole, although many of its features are useful in borehole communication with production tubing or a drill stem being the acoustic medium. Its design, however, takes into consideration the waveguide nature of a borehole. It has been found that to be practical a borehole acoustic communication system has to operate at frequencies below one kilohertz with an adequate bandwidth. The bandwidth depends on various factors, including the efficiency of the transmission medium. It has been found that a bandwidth of at least several Hertz are required for efficient communication in various liquids. The system must transfer information in a robust and reliable manner, even during periods of excessive acoustic noise and in a dynamic environment.

As an important feature of the invention, the acoustic communication system characterizes the transmission channel when (1) system operation is initiated and (2) when synchronization between the downhole acoustic transceiver (DAT) and the surface acoustic transceiver (SAT) is lost. To facilitate the channel characterization, a wide-band "chirp" signal, (a signal having its energy distributed throughout the candidate spectrum) is transmitted from the DAT to the SAT. The received signal is processed to determine the portion of the spectrum that provides an exceptional signal to noise ratio and a bandwidth capable of supporting data transmission.

As another important feature of the invention, it provides two-way communication between the locations. Each of the communication transducers is a transceiver for both receiving acoustic signals from, and for imparting acoustic signals to, the (preferably) non-moving borehole liquid. The communication is reciprocal in that it is provided by assuring that the electrical load impedance for receiving an acoustic signal from the borehole liquid equals the source impedance of such transceiver for transmitting. Most desirably, the transceivers are time synchronized to provide a robust communication system. Initial synchronization is accomplished through transmission of a synchronization signal in the form of a repetitive chirp sequence by one of the units, such as the downhole acoustic transceiver (DAT) in the preferred embodiment. The surface acoustic transceiver (SAT) processes the received sequence to establish approximate clock synchronization. When communication is between a downhole location and the surface, as in the preferred embodiment, It is preferred that most, if not all, of the data processing take place at the surface where space is plentiful.

This first synchronization is only an approximation. As another dominant feature, a second synchronization signal is transmitted from the SAT to the DAT to refine such synchronization. The second synchronization signal is comprised of two tones, each of a different frequency. Signal analysis of these tones by the DAT enables the timing of the DAT to be adjusted into synchrony with the SAT.

Although the communication system of the invention is particularly designed for use of a borehole liquid as the transmission medium, many of its features are usable to improve acoustic transmission when the transmission system utilizes a drill stem, production tubing or other means extending in a borehole as a transmission medium. For example, it provides clock correction during the time data is being transmitted. Other features and advantages of the invention either will become apparent or will be described in the following more detailed description of a preferred embodiment and alternatives.

The Measurement-While-Drilling Application:

While the preferred embodiment of the present invention discussed herein is the utilization of the communication system in a producing oil and gas well, it is also possible to utilize the transducer and the communication system of the present invention during drilling operations to transmit data, preferably through the drilling fluid, between (1) selected points in the drillstring, or (2) between a selected point in the drillstring and the earth's surface. The present invention can be utilized in parallel with a conventional measurement-while-drilling data transmission system, or as a substitute for a conventional measurement-while-drilling data transmission system. The present invention is superior to conventional measurement-while-drilling data transmission systems insofar as communication can occur while there is no circulation of fluid in the wellbore. The present invention can be utilized for the bidirectional transmission of data and remote control signals within the wellbore.

Gas Influx Detection:

The transducer and communication system of the present invention can also be utilized in a wellbore to detect the entry of natural gas into the wellbore, typically during drilling and completion operations. As those skilled in the art will understand, the introduction of high pressure gas into a fluid column in the wellbore can result in loss of control over the well, and in the worst case, can result in a blowout of the well. Present technologies are inadequate for determining both (1) that a undesirable gas influx has occurred, and (2) the location of the gas "bubble" within the fluid column (bear in mind the gas influx will travel generally upward in the fluid column). The present invention can be utilized to determine whether or not a gas bubble is present in the fluid column, and to provide a general indication of the location of the gas bubble within the fluid column. With this information, the well operator can take precautionary measurements to prevent loss of control of the well, such as by increasing or decreasing the "weight" (density) of the fluid column.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

The Transducer:

The transducer of the present invention will be described with references to FIGS. 1 through 15.

Figure 1:
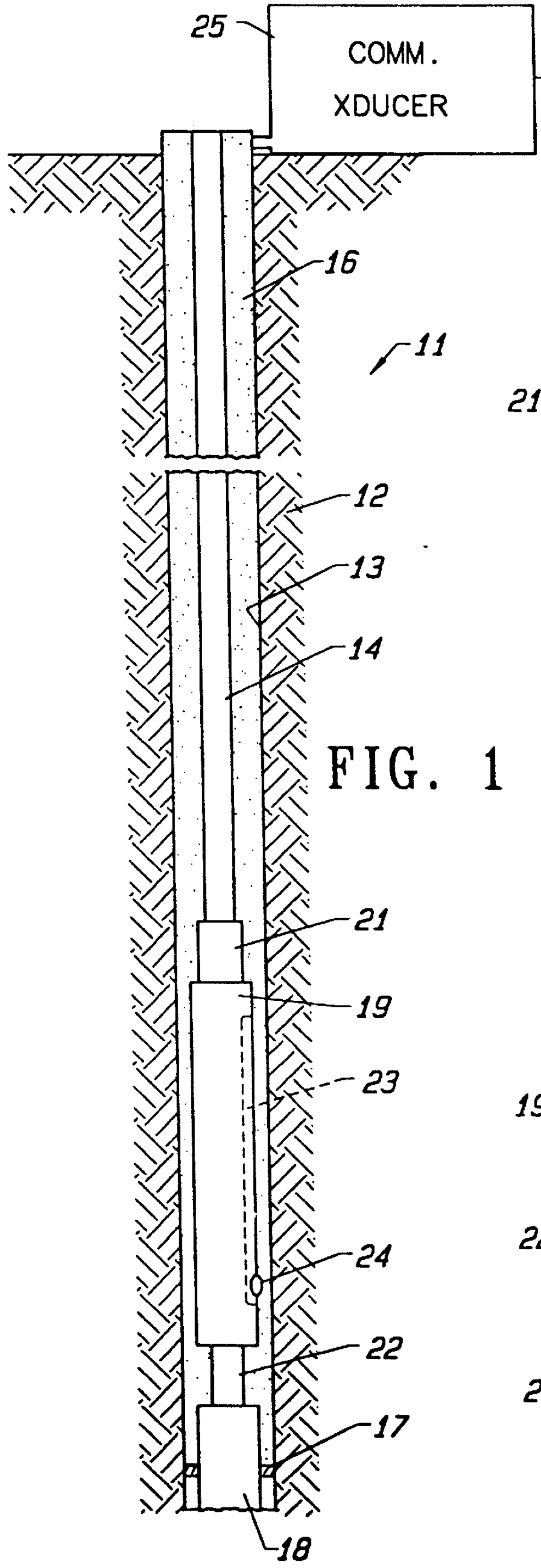
FIG. 1 is an overall schematic sectional view illustrating a potential location within a borehole of an implementation of the invention.

With reference to FIG. 1, a borehole, generally referred to by the reference numeral 11, is illustrated extending through the earth 12. Borehole 11 is shown as a petroleum product completion hole for illustrative purposes. It includes a casing schematically illustrated at 13 and production tubing 14 within which the desired oil or other petroleum product flows. The annular space between the casing and production tubing is filled with a completion liquid represented by dots 16. The viscosity of this completion liquid could be any viscosity within a wide range of possible viscosities. Its density also could be of any value within a wide range, and it may include corrosive liquid components like a high density salt such as a sodium, potassium and/or bromide compound.

In accordance with conventional practice, a packer represented at 17 is provided to seal the borehole and the completion fluid from the desired petroleum product. The production tubing 14 extends through the same as illustrated and may include a safety valve, data gathering instrumentation, or other tools on the petroleum side of the packer 17.

A carrier 19 for the transducer of the invention is provided on the lower end of the tubing 14. As illustrated, a transition 21 and one or more reflecting sections 22 (which will be discussed in more detail below) separate the carrier from the remainder of the production tubing. Such carrier includes a slot 23 within which the communication transducer of the invention is held in a conventional manner, such as by strapping or the like. A data gathering instrument, a battery pack, and other components, also could be housed within slot 23.

Figure 2:
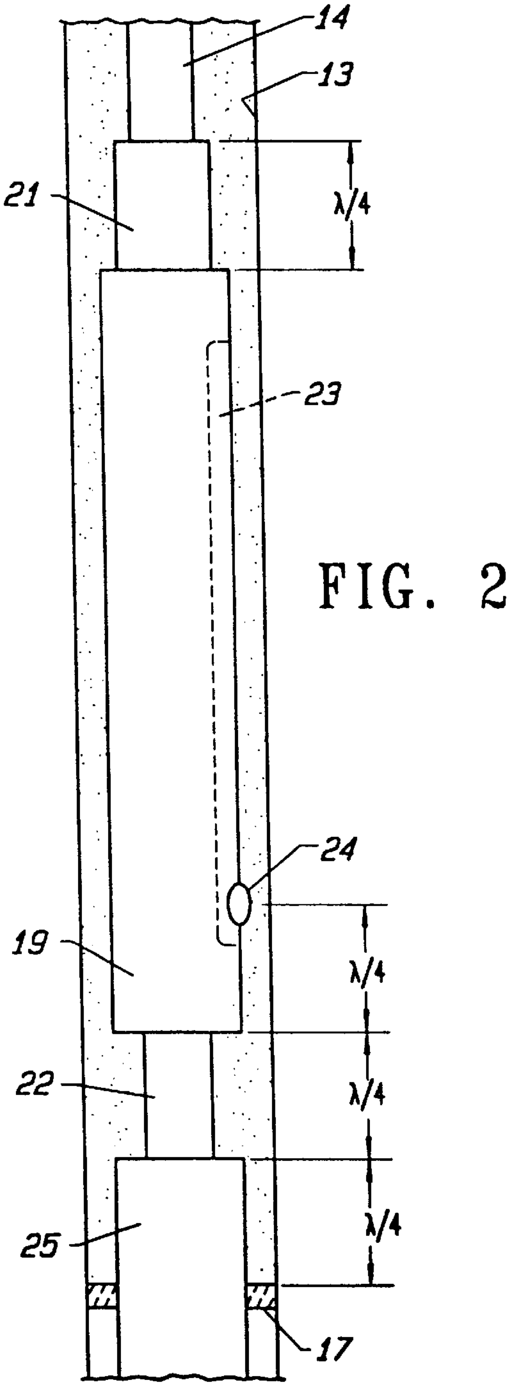
FIG. 2 is an enlarged schematic view of a portion of the arrangement shown in FIG. 1.

It is the completion liquid 16 which acts as the transmission medium for acoustic waves provided by the transducer, but any other fluid can be utilized for transmission, including but not limited to production fluids, drilling fluids, or fresh or salt water. Communication between the transducer and the annular space which confines such liquid is represented in FIGS. 1 and 2 by port 24. Data can be transmitted through the port 24 to the completion liquid and, hence, by the same in accordance with the invention. For example, a predetermined frequency band may be used for signaling by conventional coding and modulation techniques, binary data may be encoded into blocks, some error checking added, and the blocks transmitted serially by Frequency Shift Keying (FSK) or Phase Shift Keying (PSK) modulation. The receiver then will demodulate and check each block for errors.

The annular space at the carrier 19 is significantly smaller in cross-sectional area than that of the greater part of the well containing, for the most part, only production tubing 14. This results in a corresponding mismatch of acoustic characteristic admittances. The purpose of transition section 21 is to minimize the reflections caused by the mismatch between the section having the transducer and the adjacent section. It is nominally one-quarter wavelength long at the desired center frequency and the sound speed in the fluid, and it is selected to have a diameter so that the annular area between it and the casing 13 is a geometric average of the product of the adjacent annular areas, (that is, the annular areas defined by the production tubing 14 and the carrier 19). Further transition sections can be provided as necessary in the borehole to alleviate mismatches of acoustic admittances along the communication path.

Reflections from the packer (or the well bottom in other designs) are minimized by the presence of a multiple number of reflection sections or steps below the carrier, the first of which is indicated by reference numeral 22. It provides a transition to the maximum possible annular area one-quarter wavelength below the transducer communication port. It is followed by a quarter wavelength long tubular section 25 providing an annular area for liquid with the minimum cross-sectional area it otherwise would face. Each of the reflection sections or steps can be multiple number of quarter wavelengths long. The sections 19 and 21 should be an odd number of quarter wavelengths, whereas the section 25 should be odd or even (including zero), depending on whether or not the last step before the packer 17 has a large or small cross-section. It should be an even number (or zero) if the last step before the packer is from a large cross-section to a small cross-section.

While the first reflection step or section as described herein is the most effective, each additional one that can be added improves the degree and bandwidth of isolation. (Both the transition section 21, the reflection section 22, and the tubular section can be considered as parts of the combination making up the preferred transducer of the invention.)

A communication transducer for receiving the data is also provided at the location at which it is desired to have such data. In most arrangements this will be at the surface of the well, and the electronics for operation of the receiver and analysis of the communicated data also are at the surface or in some cases at another location. The receiving transducer 24 most desirably is a duplicate in principle of the transducer being described. (It is represented in FIG. 1 by box 25 at the surface of the well). The communication analysis electronics is represented by box 26.

It will be recognized by those skilled in the art that the acoustic transducer arrangement of the invention is not limited necessarily to communication from downhole to the surface. Transducers can be located for communication between two different downhole locations. It is also important to note that the principle on which the transducer of the invention is based lends itself to two-way design: a single transducer can be designed to both convert an electrical communication signal to acoustic communication waves, and vice versa.

An implementation of the transducer of the invention is generally referred to by the reference numeral 26 in FIGS. 3 through 6. This specific design terminates at one end in a coupling or end plug 27 which is threaded into a bladder housing 28. A bladder 29 for pressure expansion is provided in such housing. The housing 28 includes ports 31 for free flow into the same of the borehole completion liquid for interaction with the bladder. Such bladder communicates via a tube with a bore 32 extending through a coupler 33. The bore 32 terminates in another tube 34 which extends into a resonator 36. The length of the resonator is nominally $\lambda/4$ in the liquid within resonator 36. The resonator is filled with a liquid which meets the criteria of having low density, viscosity, sound speed, water content, vapor pressure and thermal expansion coefficient. Since some of these requirements are mutually contradictory, a compromise must be made, based on the condition of the application and design constraints. The best choices have thus far ben found among the 200 and 500 series Dow Corning silicone oils, refrigeration oils such as Capella B and lightweight hydrocarbons such as kerosene. The purpose of the bladder construction is to enable expansion of such liquid as necessary in view of the pressure and temperature of the borehole liquid at the downhole location of the transducer.

The transducer of the invention generates (or detects) acoustic wave energy by means of the interaction of a piston in the transducer housing with the borehole liquid. In this implementation, this is done by movement of a piston 37 in a chamber 38 filled with the same liquid which fills resonator 36. Thus, the interaction of piston 37 with the borehole liquid is indirect: the piston is not in direct contact with such borehole liquid. Acoustic waves are generated by expansion and contraction of a bellows type piston 37 in housing chamber 38. One end of the bellows of the piston arrangement is permanently fastened around a small opening 39 of a horn structure 41 so that reciprocation of the other end of the bellows will result in the desired expansion and contraction of the same. Such expansion and contraction causes corresponding flexures of isolating diaphragms 42 in windows 43 to impart acoustic energy waves to the borehole liquid on the other side of such diaphragms. Resonator 36 provides a compliant backload for this piston movement. It should be noted that the same liquid which fills the chamber of the resonator 36 and chamber 38 fills the various cavities of the piston driver to be discussed hereinafter, and the change in volumetric shape of chamber 38 caused by reciprocation of the piston takes place before pressure equalization can occur.

One way of looking at the resonator is that its chamber 36 acts, in effect, as a tuning pipe for returning in phase to piston 37 that acoustical energy which is not transmitted by the piston to the liquid in chamber 38 when such piston first moves. To this end, piston 37, made up of a steel bellows 46 (FIG. 4), is open at the surrounding horn opening 39. The other end of the bellows is closed and has a driving shaft 47 secured thereto. The horn structure 41 communicates the resonator 36 with the piston, and such resonator aids in assuring that any acoustic energy generated by the piston that does not directly result in movement of isolating diaphragms 42 will reinforce the oscillatory motion of the piston. In essence, its intercepts that acoustic wave energy developed by the piston which does not directly result in radiation of acoustic waves and uses the same to enhance such radiation. It also acts to provide a compliant back-load for the piston 37 as stated previously. It should be noted that the inner wall of the resonator could be tapered or otherwise contoured to modify the frequency response.

The driver for the piston will now be described. It includes the driving shaft 47 secured to the closed end of the bellows. Such shaft also is connected to an end cap 48 for a tubular bobbin 49 which carries two annular coils or windings 51 and 52 in corresponding, separate radial gaps 53 and 54 (FIG. 6) of a closed loop magnetic circuit to be described, but a greater number of bobbins could be utilized. Such bobbin terminates at its other end in a second end cap 55 which is supported in position by a flat spring 56. Spring 56 centers the end of the bobbin to which it is secured and constrains the same to limited movement in the direction of the longitudinal axis of the transducer, represented in FIG. 4 by line 57. A similar flat spring 58 is provided for the end cap 48.

In keeping with the invention, a magnetic circuit having a plurality of gaps is defined within the housing. To this end, a cylindrical permanent magnet 60 is provided as part of the driver coaxial with the axis 57. Such permanent magnet generates the magnetic flux needed for the magnetic circuit and terminates at each of its ends in a pole piece 61 and 62, respectively, to concentrate the magnetic flux for flow through the pair of longitudinally spaced apart gaps 53 and 54 in the magnetic circuit. The magnetic circuit is completed by an annular magnetically passive member of magnetically permeable material 64. As illustrated, such member includes a pair of inwardly directed annular flanges 66 and 67 which terminate adjacent the windings 51 and 52 and define one side of the gaps 53 and 54.

Figure 6:
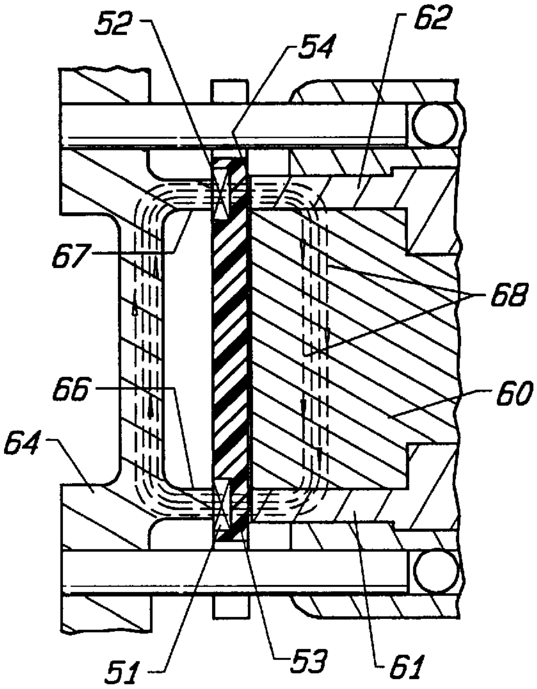
FIG. 6 is a partial, somewhat schematic sectional view showing the magnetic circuit provided by the implementation illustrated in FIGS. 3–5.

The magnetic circuit formed by this implementation is represented in FIG. 6 by closed loop magnetic flux lines 68. As illustrated, such lines extend from the magnet 60, through pole piece 61, across gap 53 and coil 51, through the return path provided by member 64, through gap 54 and coil 52, and through pole piece 62 to magnet 60. With this arrangement, it will be seen that magnetic flux passes radially outward through gap 53 and radially inward through gap 54. Coils 51 and 52 are connected in series opposition, so that current in the same provides additive force on the common bobbin. Thus, if the transducer is being used to transmit a communication, an electrical signal defining the same is passed through the coils 51 and 52 will cause corresponding movement of the bobbin 49 and, hence, the piston 37. Such piston will interact through the windows 43 with the borehole liquid and impart the communicating acoustic energy thereto. Thus, the electrical power represented by the electrical signal is converted by the transducer to mechanical power, in the form of, acoustic waves.

When the transducer receives a communication, the acoustic energy defining the same will flex the diaphragms 42 and correspondingly move the piston 37. Movement of the bobbin and windings within the gaps 51 and 52 will generate a corresponding electrical signal in the coils 51 and 52 in view of the lines of magnetic flux which are cut by the same. In other words, the acoustic power is converted to electrical power.

In the implementation being described, it will be recognized that the permanent magnet 60 and its associated pole pieces 61 and 62 are generally cylindrical in shape with the axis 57 acting as an axis of a figure of revolution. The bobbin is a cylinder with the same axis, with the coils 51 and 52 being annular in shape. Return path member 64 also is annular and surrounds the magnet, etc. The magnet is held centrally by support rods 71 projecting inwardly from the return path member, through slots in bobbin 49. The flat springs 56 and 58 correspondingly centralize the bobbin while allowing limited longitudinal motion of the same as aforesaid. Suitable electrical leads 72 for the windings and other electrical parts pass into the housing through potted feedthroughs 73.

Figure 7A:
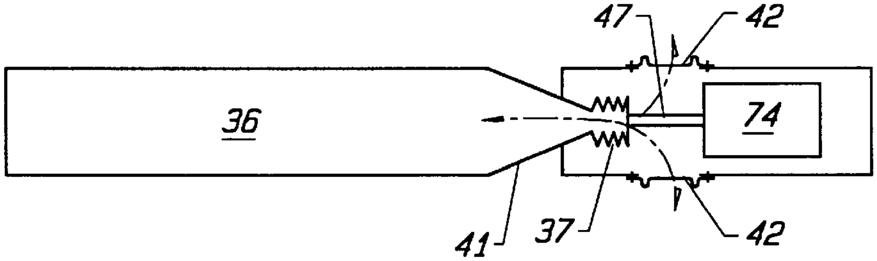
FIG. 7A is a schematic view corresponding to the implementation of the invention shown in FIGS. 3–6.
Figure 7B:
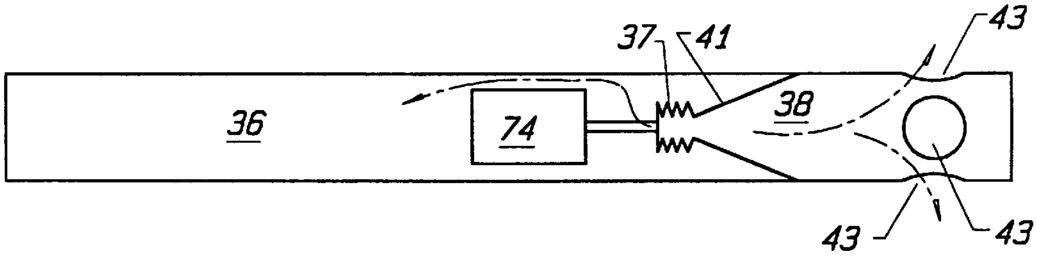
FIG. 7B is a variation on such implementation.

FIG. 7A illustrates the implementation described above in schematic form. The resonator is represented at 36, the horn structure at 41, and the piston at 37. The driver shaft of the piston is represented at 47, whereas the driver mechanism itself is represented by box 74. FIG. 7B shows an alternate arrangement in which the driver is located within the resonator 76 and the piston 37 communicates directly with the borehole liquid which is allowed to flow in through windows 43. The windows are open; they do not include a diaphragm or other structure which prevents the borehole liquid from entering the chamber 38. It will be seen that in this arrangement the piston 37 and the horn structure 41 provide fluid-tight isolation between such chamber and the resonator 36. It will be recognized, though, that it also could be designed for the resonator 36 to be flooded by the borehole liquid. It is desirable, if it is designed to be so flooded, that such resonator include a small bore filter or the like to exclude suspended particles. In any event, the driver itself should have its own inert fluid system because of close tolerances, and strong magnetic fields. The necessary use of certain materials in the same makes it prone to impairment by corrosion and contamination by particles, particularly magnetic ones.

Figure 8:
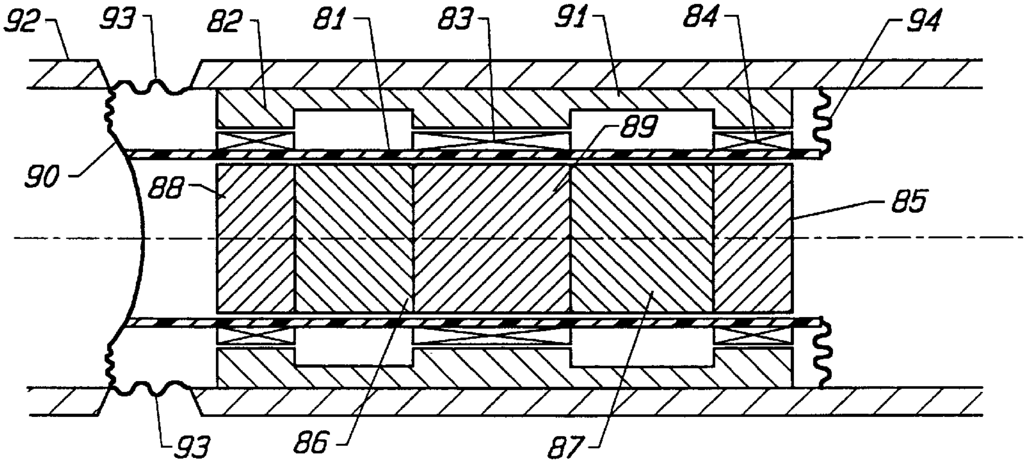
FIGS. 8 through 11 illustrate various alternate constructions.

FIGS. 8 through 12 are schematic illustrations representing various conceptual approaches and modifications for the invention, considered by applicant. FIG. 8 illustrates the modular design of the invention. In this connection, it should be noted that the invention is to be housed in a pipe of restricted diameter, but length is not critical. The invention enables one to make the best possible use of cross-sectional area while multiple modules can be stacked to improve efficiency and power capability.

The bobbin, represented at 81 in FIG. 8, carries three separate annular windings represented at 82–84. A pair of magnetic circuits are provided, with permanent magnets represented at 86 and 87 with facing magnetic polarities and poles 88–90. Return paths for both circuits are provided by an annular passive member 91.

It will be seen that the two magnetic circuits of the FIG. 8 configuration have the central pole 89 and its associated gap in common. The result is a three-coil driver with a transmitting efficiency (available acoustic power output/electric power input) greater than twice that of a single driver, because of the absence of fringing flux at the joint ends. Obviously, the process of "stacking" two coil drivers as indicated by this arrangement with alternating magnet polarities can be continued as long as desired with the common bobbin being appropriately supported. In this schematic arrangement, the bobbin is connected to a piston 85 which includes a central domed part and bellows of the like sealing the same to an outer casing represented at 92. This flexure seal support is preferred to sliding seals and bearings because the latter exhibit restriction that introduced distortion, particularly at the small displacements encountered when the transducer is used for receiving. Alternatively, a rigid piston can be sealed to the case with a bellows and a separate spring or spider used for centering. A spider represented at 94 can be used at the opposite end of the bobbin for centering the same. If such spider is metal, it can be insulated from the case and can be used for electrical connections to the moving windings, eliminating the flexible leads otherwise required.

Figure 9:
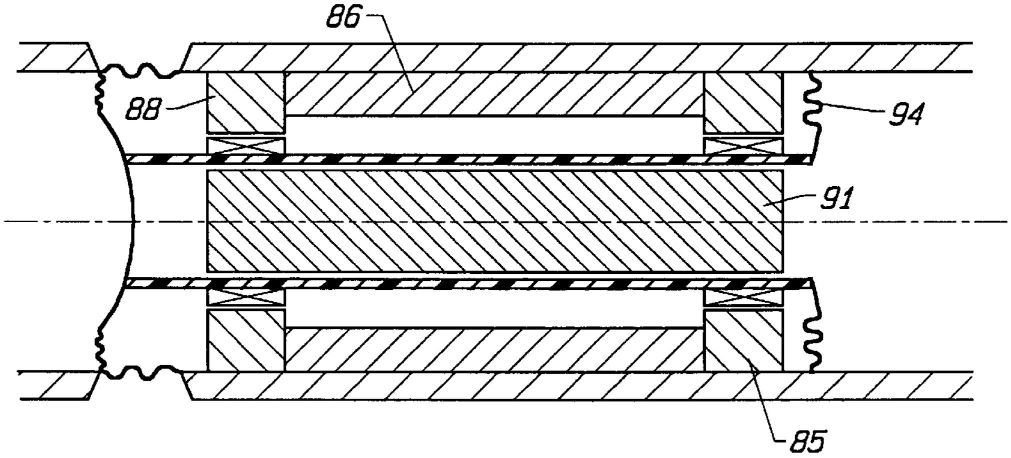

In the alternative schematically illustrated in FIG. 9, the magnet 86 is made annular and it surrounds a passive flux return path member 91 in its center. Since passive materials are available with saturation flux densities about twice the remanence of magnets, the design illustrated has the advantage of allowing a small diameter of the poles represented at 88 and 90 to reduce coil resistance and increase efficiency. The passive flux return path member 91 could be replaced by another permanent magnet. A two- magnet design, of course, could permit a reduction in length of the driver.

Figure 10:
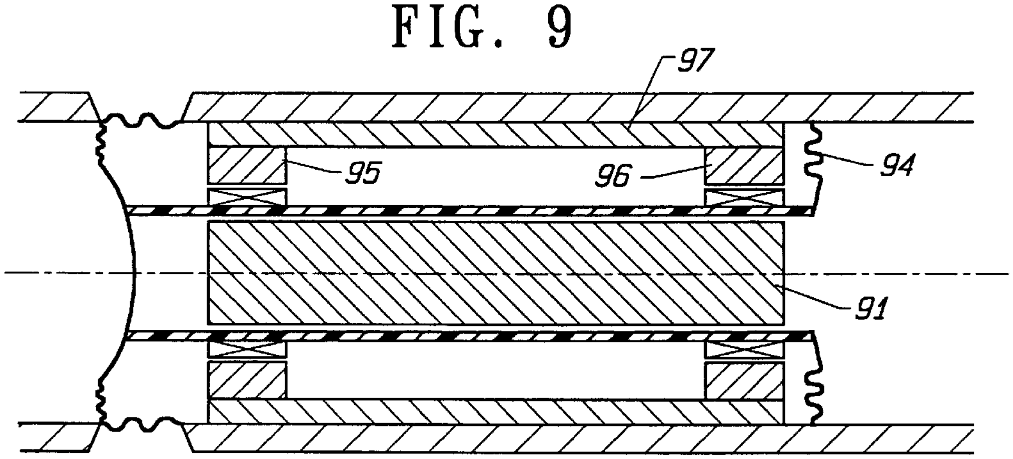

FIG. 10 schematically illustrates another magnetic structure for the driver. It includes a pair of oppositely radially polarized annular magnets 95 and 96. As illustrated, such magnets define the outer edges of the gaps. In this arrangement, an annular passive magnetic member 97 is provided, as well as a central return path member 91. While this arrangement has the advantage of reduced length due to a reduction of flux leakage at the gaps and low external flux leakage, it has the disadvantage of more difficult magnet fabrication and lower flux density in such gaps.

Figure 11:
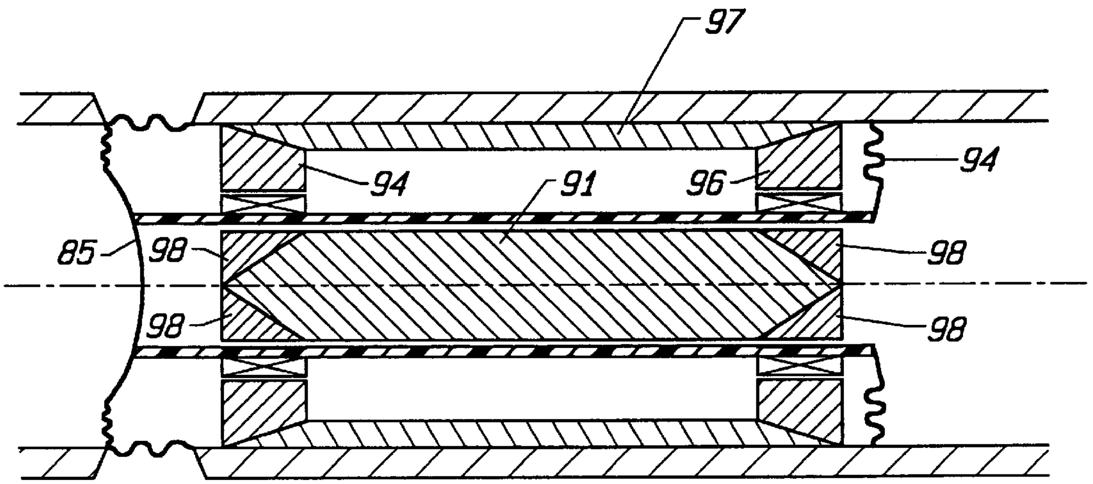

Conical interfaces can be provided between the magnets and pole pieces. Thus, the mating junctions can be made oblique to the long axis of the transducer. This construction maximizes the magnetic volume and its accompanying available energy while avoiding localized flux densities that could exceed a magnet remanence. It should be noted that any of the junctions, magnet-to-magnet, pole piece-to-pole piece and of course magnet-to-pole piece can be made conical. FIG. 11 illustrates one arrangement for this feature. It should be noted that in this arrangement the magnets may includes pieces 98 at the ends of the passive flux return member 91 as illustrated.

Figure 12:
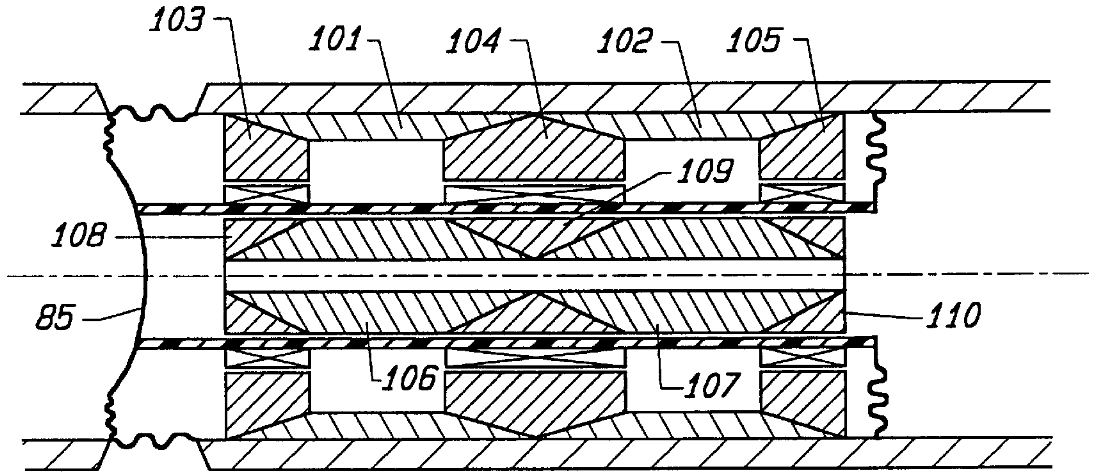
FIG. 12 illustrates in schematic form a preferred combination of such elements.

FIG. 12 schematically illustrates a particular combination of the options set forth in FIGS. 8 thorough 11 which could be considered a preferred embodiment for certain applications. It includes a pair of pole pieces 101, and 102 which mate conically with radial magnets 103, 104 and 105. The two magnetic circuits which are formed include passive return path members 106 and 107 terminating at the gaps in additional magnets 108 and 110.

An implementation of the invention incorporating some of the features mentioned above is illustrated in FIGS. 13 and 14. Such implementation includes two magnetic circuits, annular magnets defining the exterior of the magnetic circuit and a central pole piece. Moreover, the piston is in direct contact with the borehole liquid and the resonant chamber is filled with such liquid.

Figure 3:
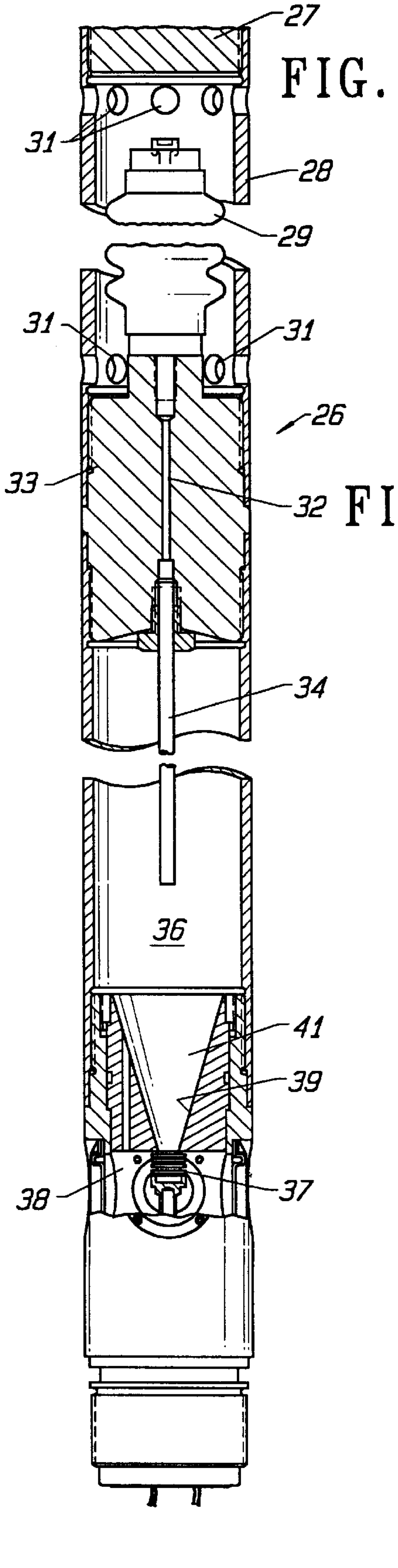
FIG. 3 is an overall sectional view of an implementation of the transducer of the instant invention.
Figure 5:
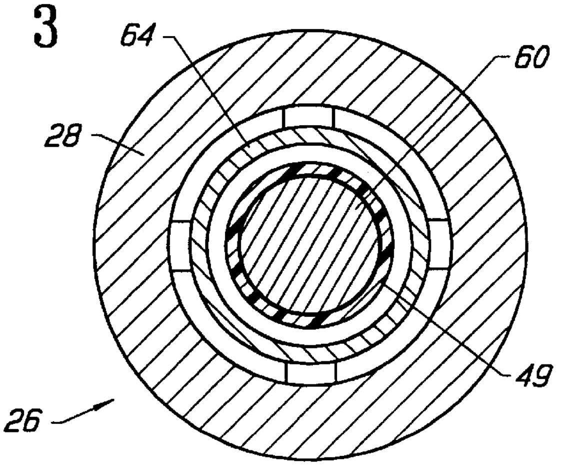
FIG. 5 is a transverse sectional view, taken on a plane indicated by the lines 5—5 in FIG. 4.
Figure 4:
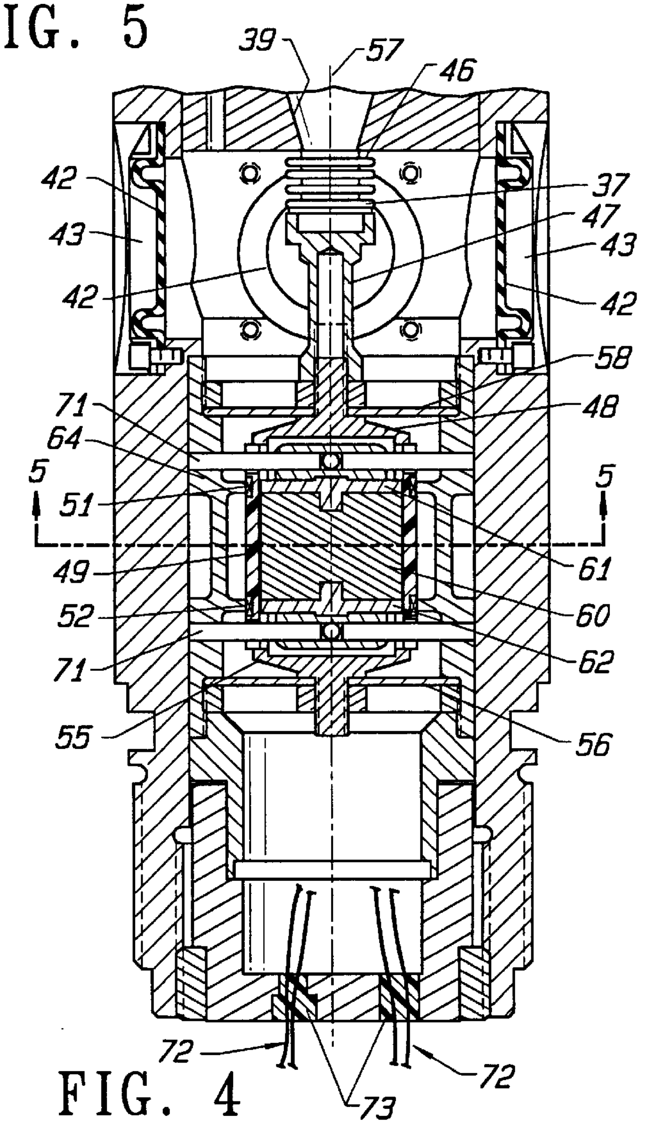
FIG. 4 is an enlarged sectional view of a portion of the construction shown in FIG. 3.
Figures 13A, 13B, 13C:
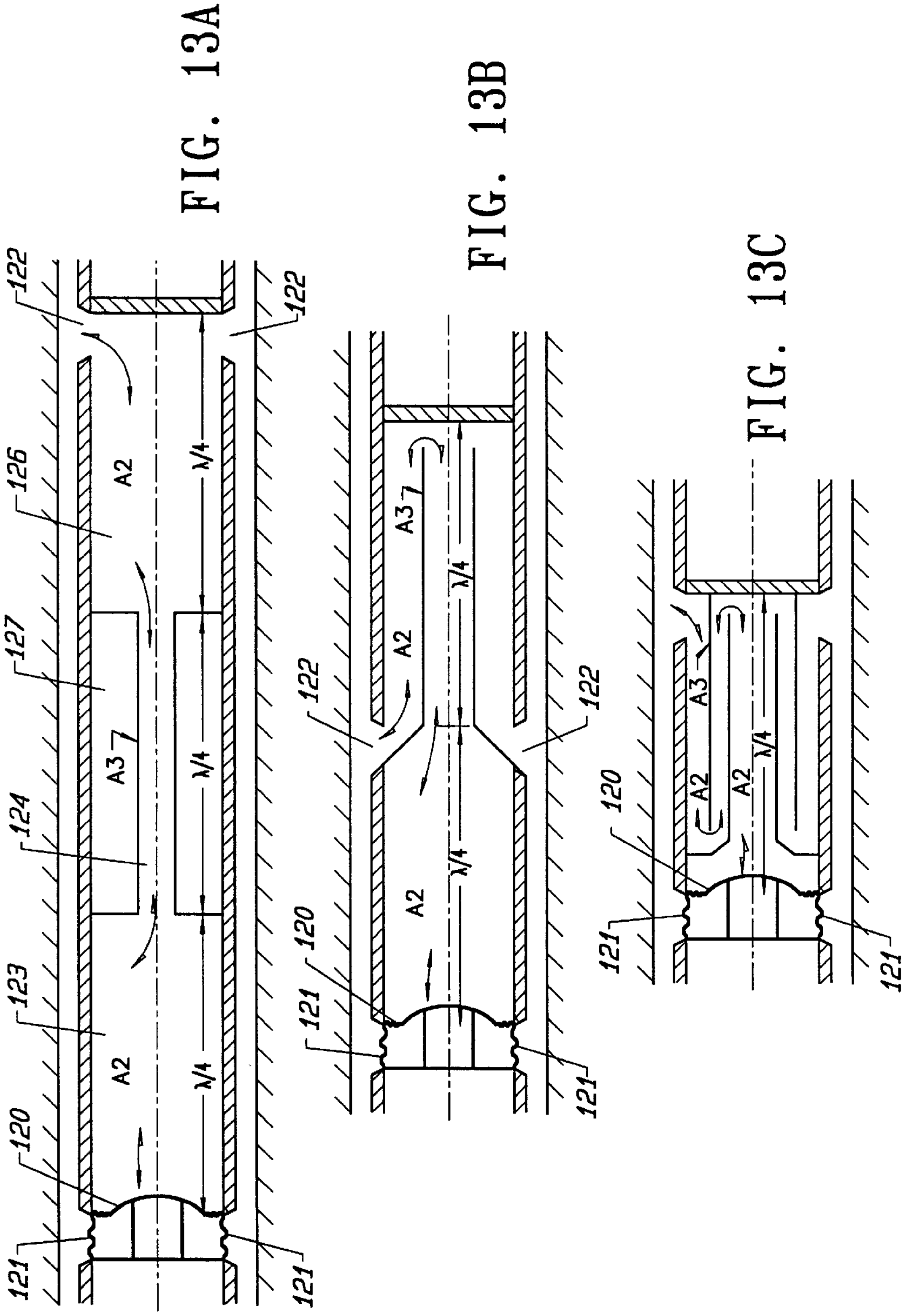
FIG. 13 is an overall sectional view of another implementation of the instant invention.
Figure 14:
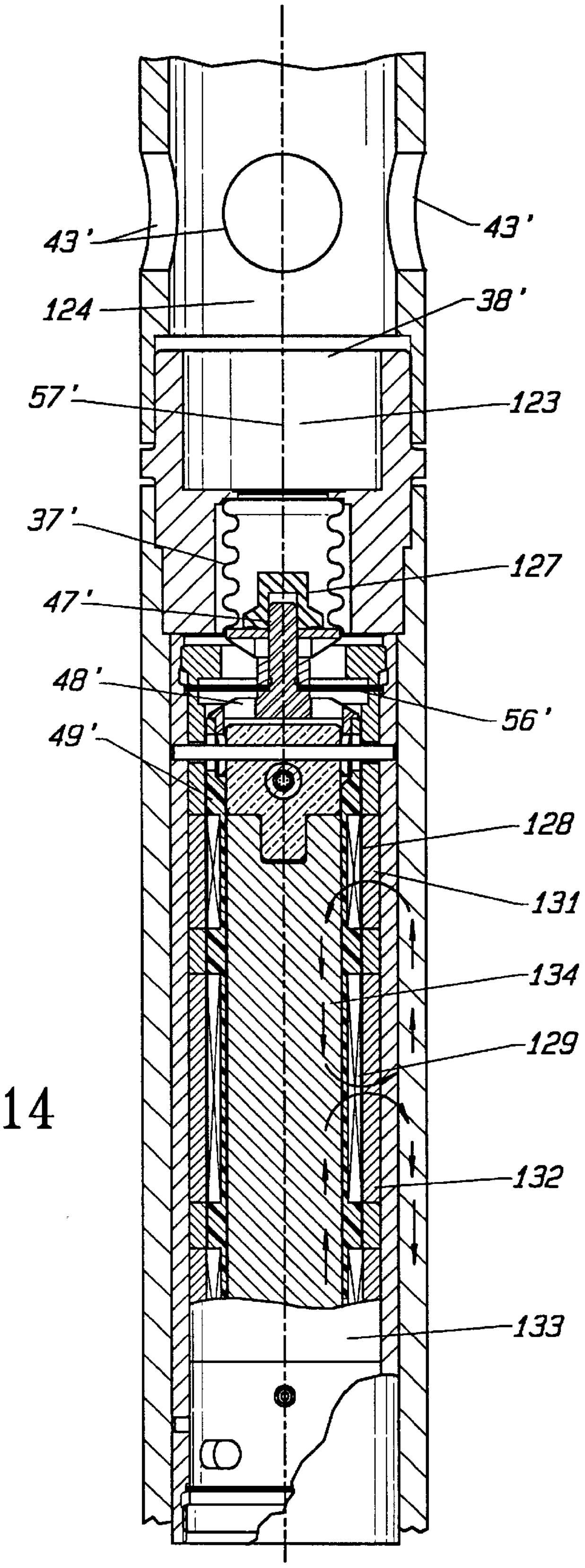
FIG. 14 is an enlarged sectional view of a portion of the construction shown in FIG. 13.

The implementation shown in FIGS. 13 and 14 is similar in many aspects to the implementation illustrated and described with respect to FIGS. 3 and 6. Common parts will be referred to by the same reference numerals used earlier but with the addition of prime component. This implementation includes many of the features of he earlier one, which features should be considered as being incorporated within the same, unless indicated otherwise.

The implementation of FIGS. 13 and 14 is generally referred to by the reference numeral 120. The resonator chamber 36' is downhole of this piston 37' and its driver, in this arrangement, and is allowed to be filled with borehole liquid rather than being filled with a special liquid as described in connection with the earlier implementation. The bladder and its associated housing is eliminated and the end plug 27' is threaded directly into the resonator chamber 36. Such end plug includes a plurality of elongated bores 122 which communicate the borehole with tube 34' extending in to the resonator 36. As with the previously described implementation, the tube 34' is nominally a quarter of the communication wavelength long in the resonator fluid (the borehole liquid in this implementation). The diameter of the bores 122 is selected relative to the interior diameter of tube 34' to assure that not particulate matter from the borehole liquid which is of a sufficiently large size to block such tube will enter the same.

It will be recognized that while with this arrangement the chamber 36' which provides a compliant backload for movement of the piston 37' is in direct communication with the borehole liquid through the tube 34', acoustic wave energy in the same will not be transmitted to the exterior of the chamber because of attenuation by such tube.

Piston 37' is a bellows as described in the earlier implementation and acts to isolate the driver for the same to be described from a chamber 38' which is allowed to be filled with the borehole liquid. Such chamber 38' is illustrated as having two parts, parts 123 and 124, that communicate directly with one another. As illustrated, windows 43' extend to the annulus surrounding the transducer construction without the intermediary of isolating diaphragms as in the previous implementation. Thus, in this implementation the piston 37' is in direct contact with borehole liquid which fills the chamber 38'.

The piston 37' is connected via a nut 127 and driving shaft 128 to the driver mechanism. To this end, the driving shaft 128 is connected to an end cap 48' of a tubular bobbin 49'. The bobbin 49' carries three annular coils or windings in a corresponding number of radial gaps of two closed loop magnetic circuits to be described. Two of these windings are represented at 128 and 129. The third winding is on the axial side of winding 129 opposite that of winding 128 in accordance with the arrangement shown in FIG. 8. Moreover, winding 129 is twice the axial length of winding 128. The bobbin 49' is constrained in position similarly to bobbin 49' by springs 56' and 58'.

The driver in this implementation conceptually is a hybrid of the approaches illustrated in FIGS. 8 and 9. That is, it includes two adjacent magnetic circuits sharing a common pathway. Moreover, the permanent magnets are annular surrounding a solid core providing a passive member. In more detail, three magnets illustrated in FIG. 14 at 131, 132 and 133, develop flux which flows across the gaps within which the windings previously described ride to a solid, cylindrical core passive member 132. The magnetic circuits are completed by an annular casing 134 which surrounds the magnets. Such casing 134 is fluid tight and acts to isolate the driver as described from the borehole liquid. In this connection, it includes at its end spaced from piston 37', an isolation bellows 136 which transmits pressure changes caused in the driver casing 132 to the resonator 36'. The bellows 136 is free floating in the sense that it is not physically connected to the tubular bobbin 49' and simply flexes to accommodate the pressure changes of the special fluid in the driver casing. It sits within a central cavity or borehole 37 within a plug 38 that extends between the driver casing and the wall of the resonant chamber 36'. An elongated hole or aperture 139 connects the interior of bellows 136 with the resonator chamber.

Figures 15A, 15B, 15C:
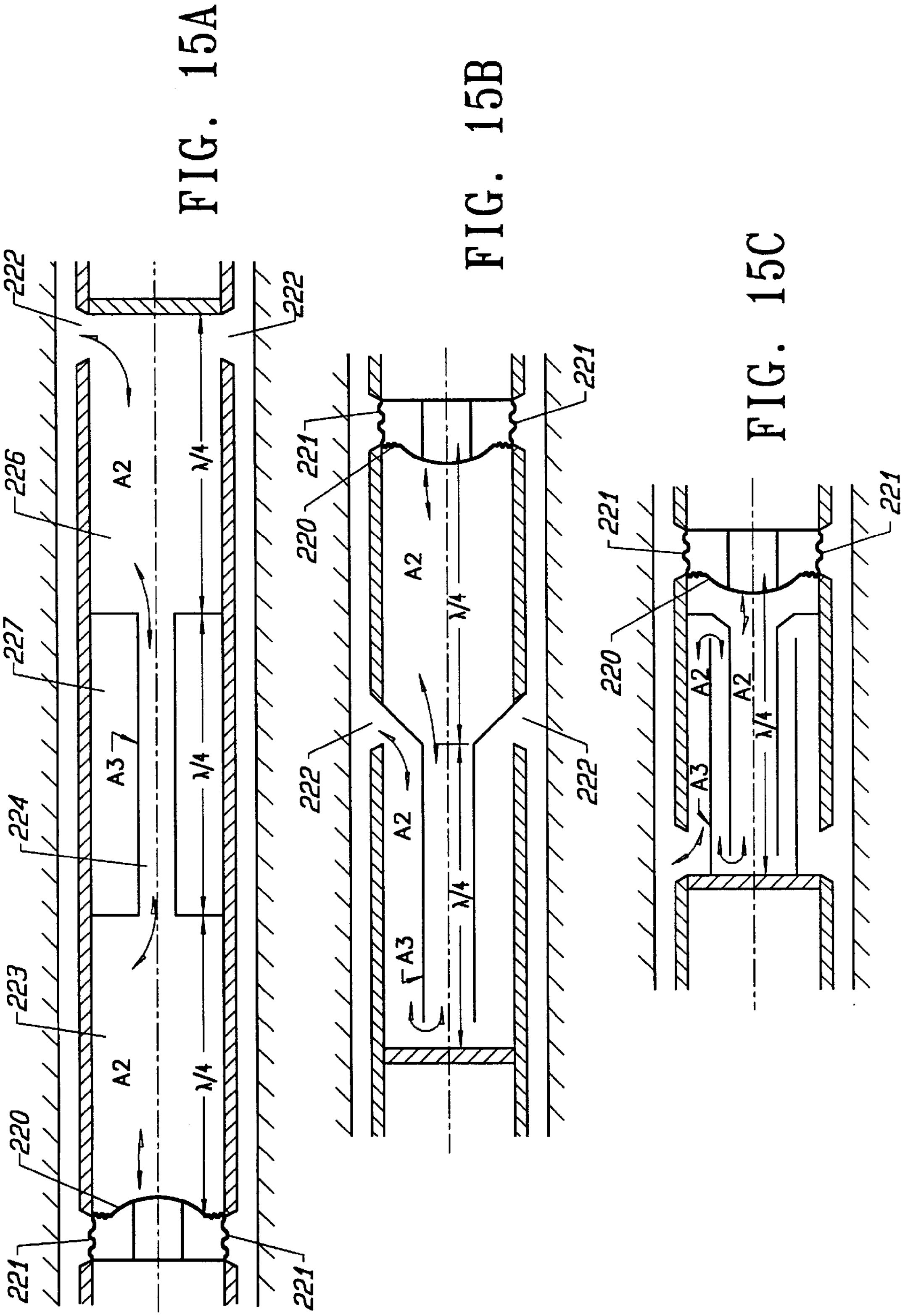
FIGS. 15A–15C illustrate in schematic cross-section various constructions of a directional coupler portion of the invention.

A passive directional coupling arrangement is conceptually illustrated by FIGS. 15A–15C. The piston of the transducer is represented at 220. Its design is based on the fact that the acoustic characteristic admittance in a cylindrical waveguide is proportional to its cross-sectional area. The windows for transmission of the communicating acoustic energy to the borehole fluid are represented at 221. A second port or annular series of ports 222 are located either three one-quarter wavelength section (FIG. 15A) or one-quarter wavelength sections (FIGS. 15B and C) from the windows 221. The coupler is divided into three quarter wavelength sections 223–226. The cross-sectional area of these sections are selected to minimize any mismatch which might defeat directional coupling. Center section 224 has a cross-sectional area $A_3$ which is nominally equal to the square of the cross-sectional area of sections 223 and 226 ($A_2$) divided by the annular cross-section of the borehole at the location of the ports 221 and 222. The reduced cross-sectional area of section 224 is obtained by including an annular restriction 227 in the same.

The directional coupler is in direct contact with the backside of the piston 220, with the result that acoustic wave energy will be introduced into the coupler which is 180° out-of-phase with that of the desired communication. The relationship of the cross-sectional areas described previously will assure that the acoustic energy which emanates from the port 222 will cancel any transmission from port 221 which otherwise would travel toward port 222.

The version of the directional coupler represented in FIG. 15A is full length, requiring a three-quarter wavelength long tubing, i.e., the chamber is divided into three, quarter-wavelength-long sections. The versions represented in FIGS. 15B and 15C are folded versions, thereby reducing the length required. That is, the version in FIG. 15B is folded once with the sectional areas of the sections meeting the criteria discussed previously. Two of the chamber sections are coaxial with one another. The version represented in FIG. 15C is folded twice. That is, all three sections are coaxial. The two versions in FIGS. 15B and 15C are one-fourth wavelength from the port 222 and thus are on the "uphole" side of port 221 as illustrated. It will be recognized, though, that the bandwidth of effective directional coupling is reduced with folding.

It will be recognized that in any of the configurations of FIGS. 15A–15C, the port 222 could contain a diaphragm or bellows, an expansion chamber could be added, and a filling fluid other than well fluid could be used. Additional contouring of area could also be done to modify coupling bandwidth and efficiency. Shaping of ports and arraying of multiple ports could also be done for the same purpose.

Directional coupling also could be obtained by using two or more transducers of the invention as described with ports axially separated to synthesize a phased array. The directional coupling would be achieved by driving each transducer with a signal appropriately predistorted in phase and amplitude. Such active directional coupling can be achieved over a wider bandwidth than that achieved with a passive system. Of course, the predistortion functions would have to account for all coupled resonances in each particular situation.

The Communication System:

The communication system of the present invention will be described with reference to FIGS. 16 through 23.

Figure 16:
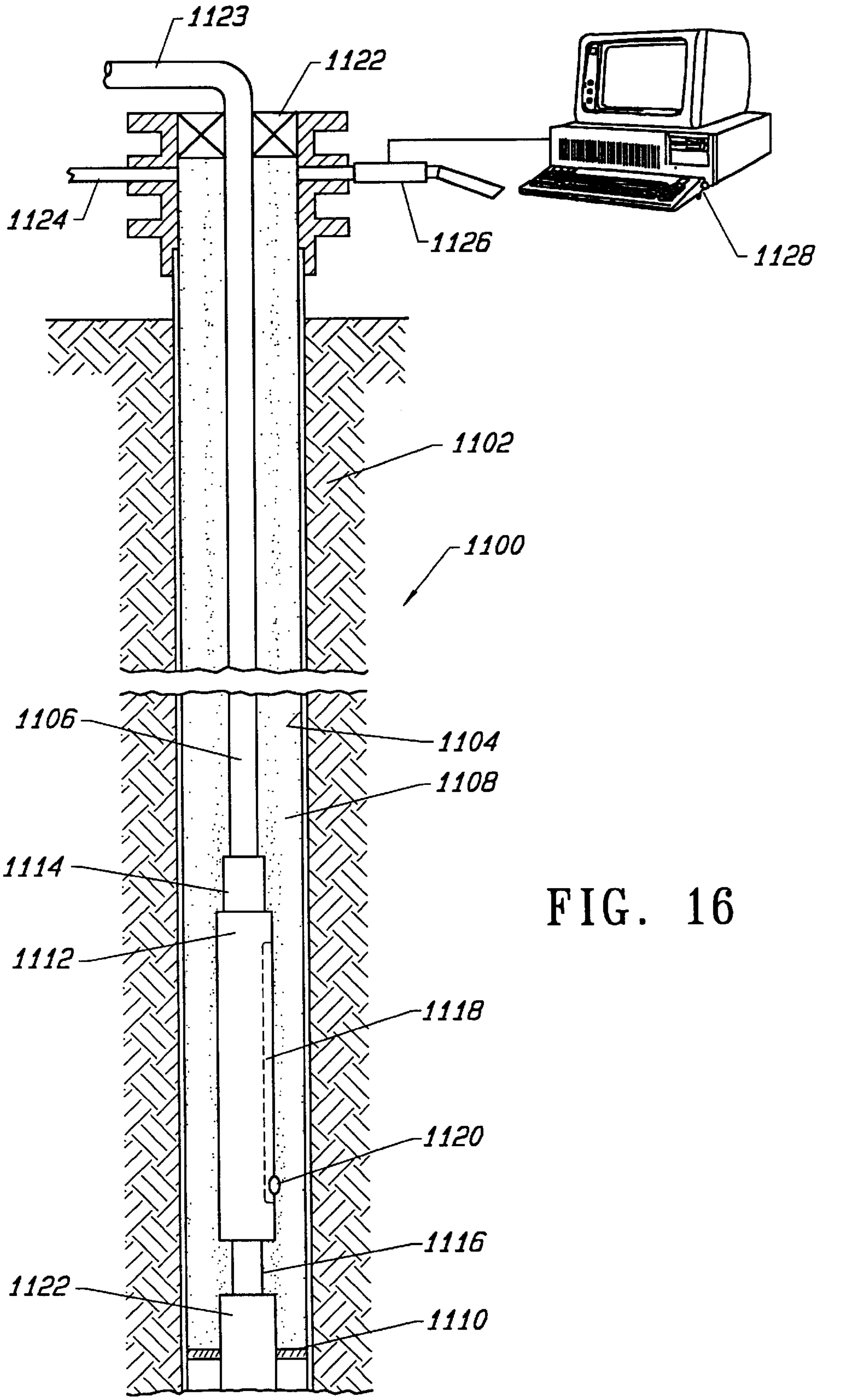
FIG. 16 is an overall somewhat diagrammatic sectional view illustrating an implementation of the invention, a potential location within a borehole for the same.

With reference to FIG. 16, a borehole, generally referred to by the reference numeral 1100, is illustrated extending through the earth 1102. Borehole 1100 is shown as a petroleum product completion hole for illustrative purposes. It includes a casing schematically illustrated at 1104 and production tubing 1106 within which the desired oil or other petroleum product flows. The annular space between the casing and production tubing is filled with borehole completion liquid represented by dots 1108. The properties of a completion fluid vary significantly from well to well and over time in any specific well. It typically will include suspended particles or partially be a gel. It is non-Newtonian and may include non-linear elastic properties. Its viscosity could be any viscosity within a wide range of possible viscosities. Its density also could be of any value within a wide range, and it may include corrosive solid or liquid components like a high density salt such as a sodium, calcium, potassium and/or a bromide compound.

A carrier 1112 for a downhole acoustic transceiver (DAT) and its associated transducer is provided on the lower end of the tubing 1106. As illustrated, a transition section 1114 and one or more reflecting sections 1116, most desirably are included and separate carrier 1112 from the remainder of production tubing 1106. Carrier 1112 includes numerous slots in accordance with conventional practice, within one of which, slot 1118, the communication transducer (DAT) of the invention is held by strapping or the like. One or more data gathering instruments or a battery pack also could be housed within slots like slot 1118. In the preferred embodiment, one slot is utilized to house a battery pack, and another slot (slot 1118) is utilized to house the transducer and associated electronics. It will be appreciated that a plurality of slots could be provided to serve the function of slot 1118. The annular space between the casing and the production tubing is sealed adjacent the bottom of the borehole by packer 1110. The production tubing 1106 extends through the packer and a safety valve, data gathering instrumentation, and other wellbore tools, may be included.

It is the completion liquid 1108 which acts as the transmission medium for acoustic waves provided by the transducer. Communication between the transducer and the annular space which confines such liquid is represented in FIG. 16 by port 1120. Data can be transmitted through the port 1120 to the completion liquid via acoustic signals. Such communication does not rely on flow of the completion liquid.

A surface acoustic transceiver (SAT) 1126 is provided at the surface, communicating with the completion liquid in any convenient fashion, but preferably utilizing a transducer in accordance with the present invention. The surface configuration of the production well is diagrammatically represented and includes an end cap on casing 1104. The production tubing 1106 extends through a seal represented at 1122 to a production flow line 1123. A flow line for the completion fluid 1124 is also illustrated, which extends to a conventional circulation system.

In its simplest form, the arrangement converts information laden data into an acoustic signal which is coupled to the borehole liquid at one location in the borehole. The acoustic signal is received at a second location in the borehole where the data is recovered. Alternatively, communication occurs between both locations in a bidirectional fashion. And as a further alternative, communication can occur between multiple locations within the borehole such that a network of communication transceivers are arrayed along the borehole. Moreover, communication could be through the fluid in the production tubing through the product which is being produced. Many of the aspects of the specific communication method described are applicable as mentioned previously to communication through other transmission medium provided in a borehole, such as in the walls of the tubing 1106.

Figure 17:
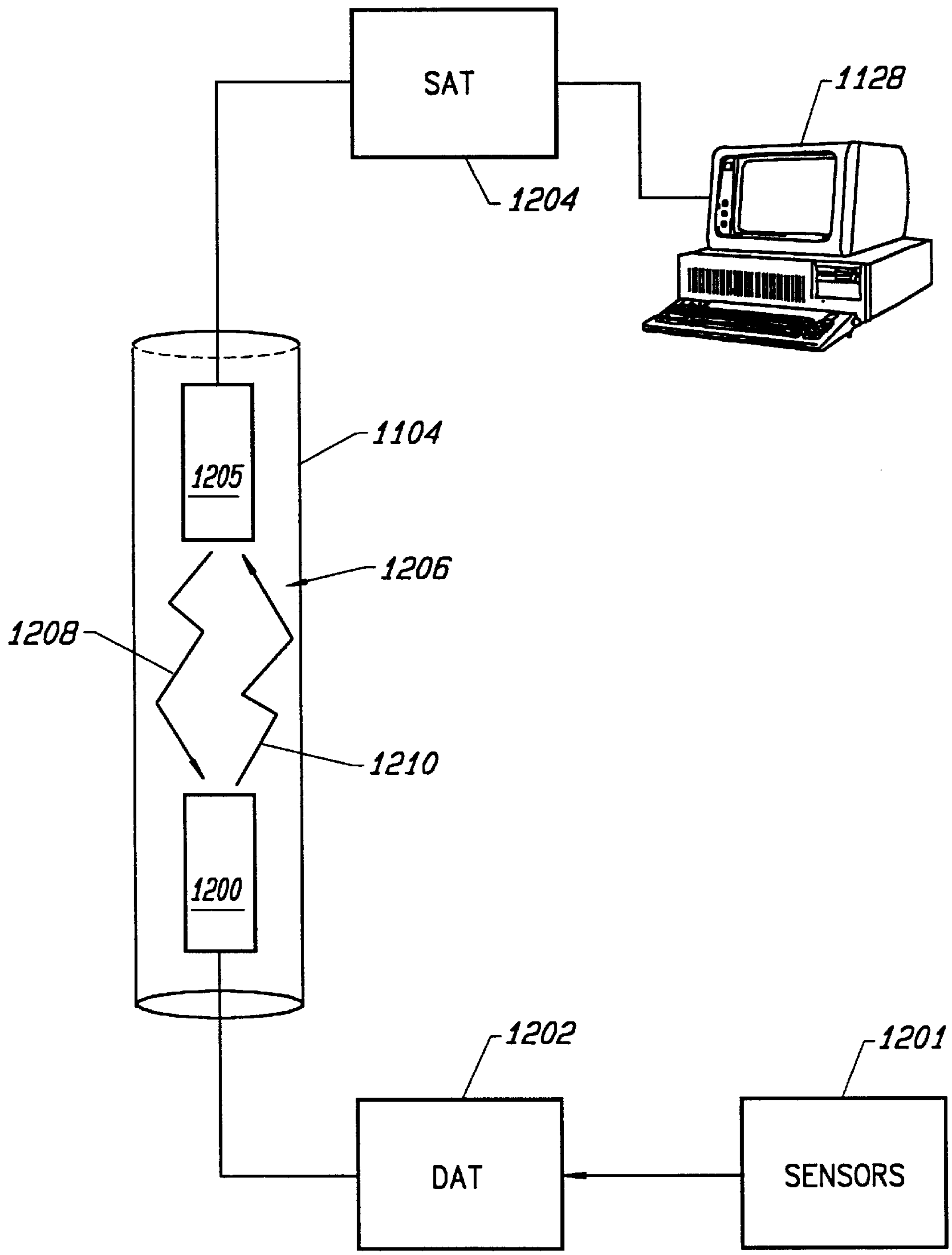
FIG. 17 is a block diagram of a preferred embodiment of the invention.

Referring to FIG. 17, the downhole acoustic transducer (DAT) 1200 at the downhole location is coupled to a downhole acoustic transceiver (DAT) data acquisition system 1202 for acoustically transmitting data collected from the DAT's associated sensors 1201. The downhole acoustic transceiver (DAT) data acquisition system 1202 includes signal processing circuitry, such as impedance matching circuits, amplifier circuits, filter circuits, analog-to-digital conversion circuits, power supply circuits, and a microprocessor and associated circuitry. The DAT 1202 is capable of both modulating an electrical signal used to stimulate the transducer 1200 for transmission, and of demodulating signals received by the transducer 1200 from the surface acoustic transceiver (SAT) 1204 data acquisition system. The surface acoustic transceiver (SAT) data acquisition system 1204 includes signal processing circuitry, such as impedance matching circuits, amplifier circuits, filter circuits, analog-to-digital conversion circuits, power supply circuits, and a microprocessor and associated circuitry. In other words, the DAT 1202 both receives and transmits information. Similarly, the SAT 1204 both receives and transmits information. The communication is directly between the DAT 1202 and the SAT 1204 through transducers 1200, 1205. Alternatively, intermediary transceivers could be positioned within the borehole to accomplish data relay. Additional DATs could also be provided to transmit independently gathered data from their own sensors to the SAT or to another DAT.

More specifically, the bidirectional communication system of the invention establishes accurate data transfer by conducting a series of steps designed to characterize the borehole communication channel 1206, choose the best center frequency based upon the channel characterization, synchronize the SAT 1204 with the DAT 1202, and, finally, bi-directionally transfer data. This complex process is undertaken because the channel 1206 through which the acoustic signal must propagate is dynamic, and this time variant. Furthermore, the channel is forced to be reciprocal: the transducers are electrically loaded as necessary to provide for reciprocity.

In an effort to mitigate the effects of the channel interference upon the information throughput, the inventive communication system characterizes the channel in the uphole direction 1210. To do so, the DAT 1202 sends a repetitive chirp signal which the SAT 1204, in conjunction with its computer 1128, analyzes to determine the best center frequency for the system to use for effective communication in the uphole direction. Currently, the channel 1210 is characterized only in the uphole direction; thus, an implicit assumption of reciprocity is incorporated into the design. It will be recognized that the downhole direction 1208 could be characterized rather than, or in addition to, characterization for uphole communication. Moreover, in the current design, the bit rate of the data transmitted by the DAT 1202 may be higher than the commands sent by the SAT 1204 to the DAT 1202. Thus, it is advantageous to achieve the best signal to noise ratio for the uphole signals.

Alternatively, if reciprocity is not met, each transceiver could be designed to characterize the channel in the incoming communication direction: the SAT 1204 could analyze the channel for uphole communication 1210 and the DAT 1202 could analyze for downhole communication 1208, and then command the corresponding transmitting system to use the best center frequency for the direction characterized by it. However, this alternative would require extra processing capability in the DAT 1202. Extra processing capability means greater power and size requirements which are, in most instances, undesirable.

In addition to choosing a proper channel for transmission, system timing synchronization is important to any coherent communication system. To accomplish the channel characterization and timing synchronization processes together, the DAT begins transmitting repetitive chirp sequences after a programmed time delay selected to be longer than the expected lowering time.

Figure 20A:
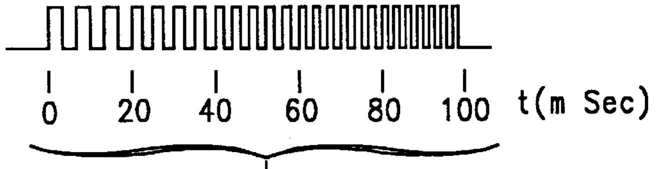
FIG. 20A, 20B, and 20C depict the synchronization signal structure.
Figure 20B:
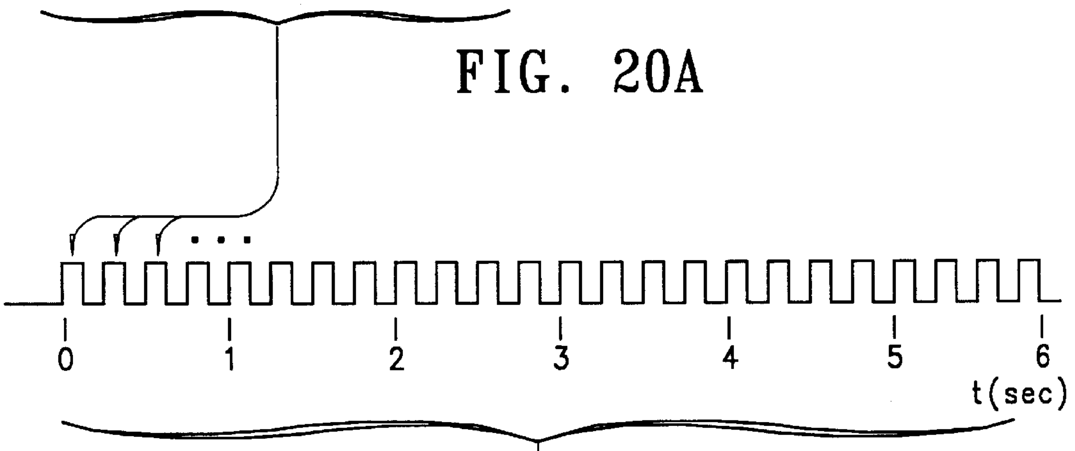
Figure 20C:
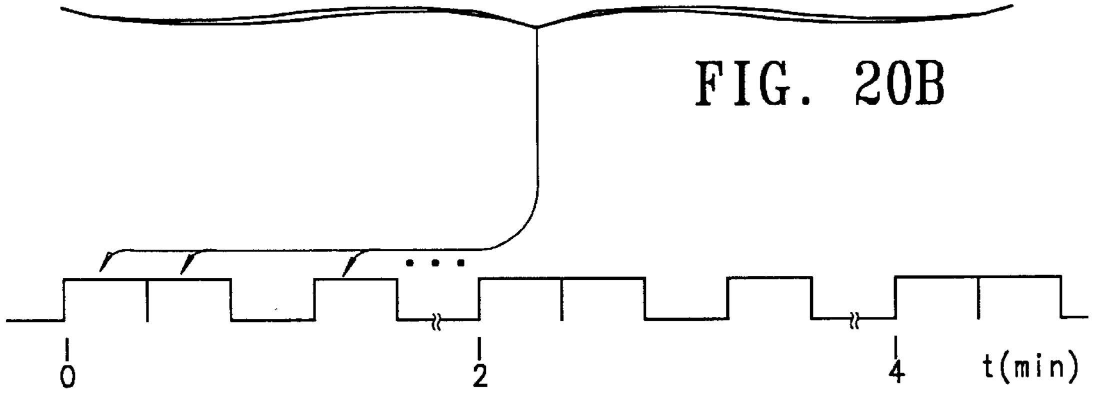

FIGS. 20A–C depict the signalling structure for the chirp sequences. In a preferred implementation, a single chirp block is one hundred milliseconds in duration and contains three cycles of one hundred fifty (150) Hertz signal, four cycles of two hundred (200) Hertz signal, five cycles of two hundred and fifty (250) Hertz signal, six cycles of three hundred (300) Hertz signal, and seven cycles of three hundred and fifty (350) Hertz cycles. The chirp signal structure is depicted in FIG. 20A. Thus, the entire bandwidth of the desired acoustic channel, one hundred and fifty to three hundred and fifty (150–350) Hertz, is chirped by each block.

As depicted in FIG. 20B, the chirp block is repeated with a time delay between each block. As shown in FIG. 20, this sequence is repeated three times at two minute intervals. The first two sequences are transmitted sequentially without any delay between them, then a delay is created before a third sequence is transmitted. During most of the remainder of the interval, the DAT 1202 waits for a command (or default tone) from the SAT 1204. The specific sequence of chirp signals should not be construed as limiting the invention: variations on the basic scheme, including but not limited to different chirp frequencies, chirp durations, chirp pulse separations, etc., are foreseeable. It is also contemplated that PN sequences, an impulse, or any variable signal which occupies the desired spectrum could be used.

Figure 22:
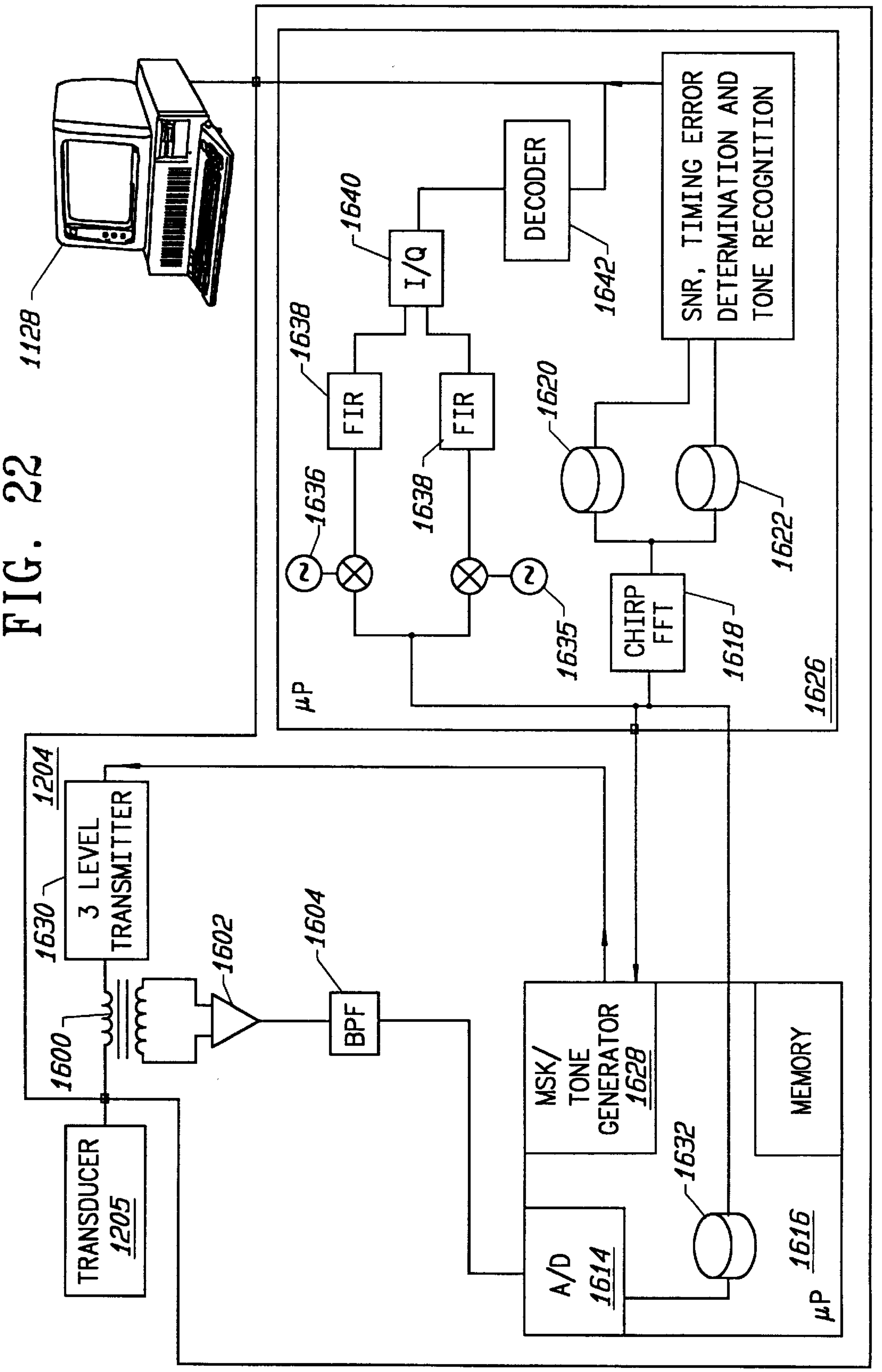
FIG. 22 is a detailed block diagram of the surface acoustic transceiver.

The SAT 1204 of the preferred embodiment of the invention uses two microprocessors 1616, 1626 to effectively control the SAT functions, as is illustrated in FIG. 22. The host computer 1128 controls all of the activities of the SAT 1204 and is connected thereto via one of two serial channels of a Model 68000 microprocessor 1626 in the SAT 1204. In alternative embodiments, the SAT 1204 may be mounted on an input/output card which is adapted in size to be inserted within an expansion slot of a host computer. The 68000 microprocessor accomplishes the bulk of the signal processing functions that are discussed below. The second serial channel of the 68000 microprocessor is connected to a 68HC11 processor 1616 that controls the signal digitization, the retrieval of received data, and the sending of tones and commands to the DAT. The chirp sequence is received from the DAT by the transducer 1205 and converted into an electrical signal from an acoustic signal. The electrical signal is coupled to the receiver through transformer 1600 which provides impedance matching. Amplifier 1602 increases the signal level, and the bandpass filter 1604 limits the noise bandwidth to three hundred and fifty (350) Hertz centered at two hundred and fifty (250) Hertz and also functions as an anti-alias filter. Of course, different or additional bandwidths between as large as one kilohertz to as small as one Hertz could be utilized in alternative embodiments of the present invention, but for purposes of this written description, the range of frequencies between one hundred Hertz and three hundred Hertz will be discussed and utilized as an example, and not as a limitation of the present invention.

Figure 21:
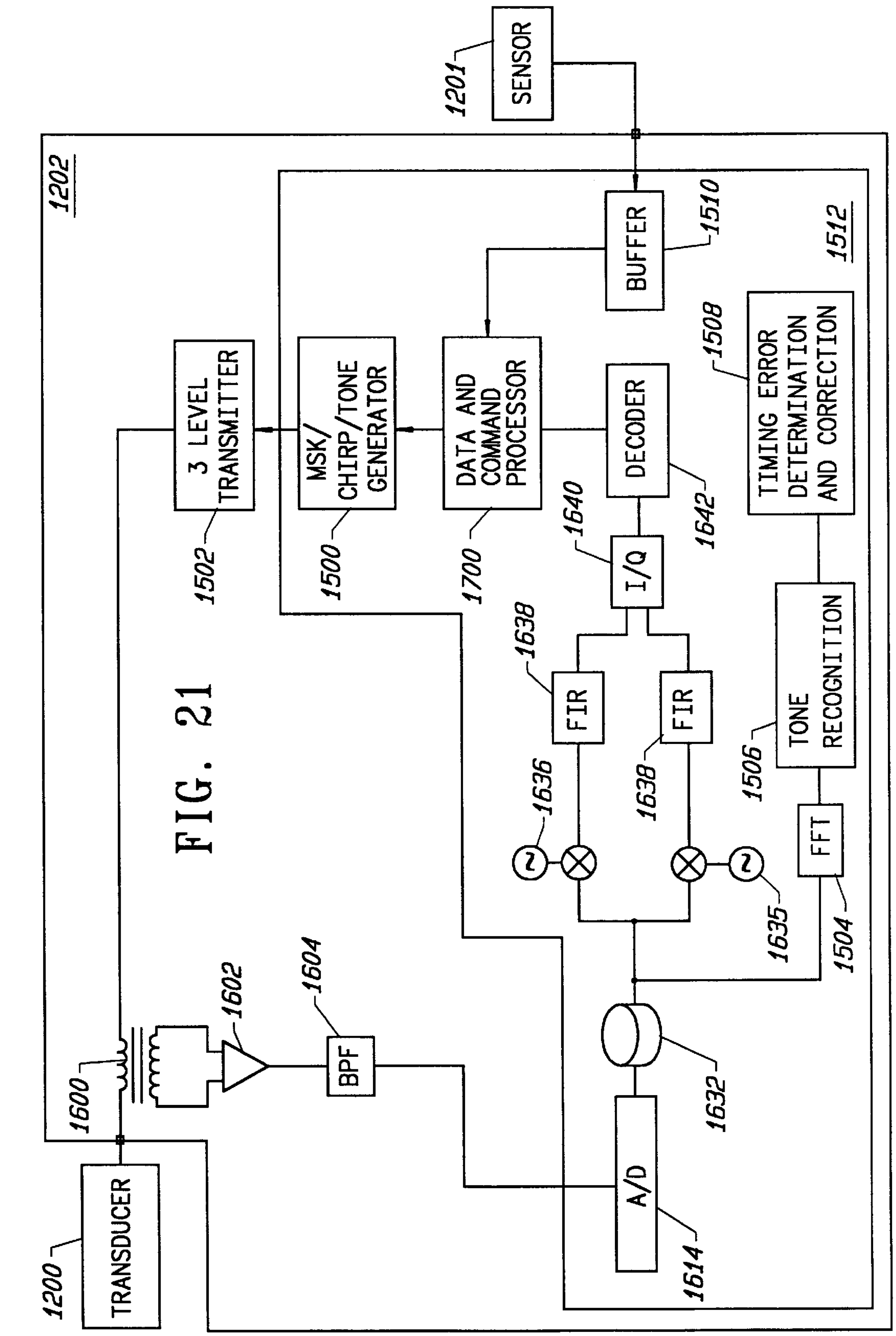
FIG. 21 is a detailed block diagram of the downhole acoustic transceiver.

Referring to FIG. 21, the DAT 1202 has a single 68HC11 microprocessor 1512 that controls all transceiver functions, the data logging activities, logged data retrieval and transmission, and power control. For simplicity, all communications are interrupt-driven. In addition, data from the sensors are buffered, as represented by block 1510, as it arrives. Moreover, the commands are processed in the background by algorithms 1700 which are specifically designed for that purpose.

The DAT 1202 and SAT 1204 include, though not explicitly shown in the block diagrams of FIGS. 21 and 22, all of the requisite microprocessor support circuitry. These circuits, including RAM, ROM, clocks, and buffers, are well known in the art of microprocessor circuit design.

Generation of the chirp sequence is accomplished by a digital signal generator controlled by the DAT microprocessor 1512. Typically, the chirp block is generated by a digital counter having its output controlled by a microprocessor to generate the complete chirp sequence. Circuits of this nature are widely used for variable frequency clock signal generation. The chirp generation circuitry is depicted as block 1500 in FIG. 21, a block diagram of the DAT 1202. Note that the digital output is used to generate a three level signal at 1502 for driving the transducer 1200. It is chosen for this application to maintain most of the signal energy in the acoustic spectrum of interest: one hundred and fifty Hertz to three hundred and fifty Hertz. The primary purpose of the third state is to terminate operation of the transmitting portion of a transceiver during its receiving mode: it is, in essence, a short circuit.

Figure 18:
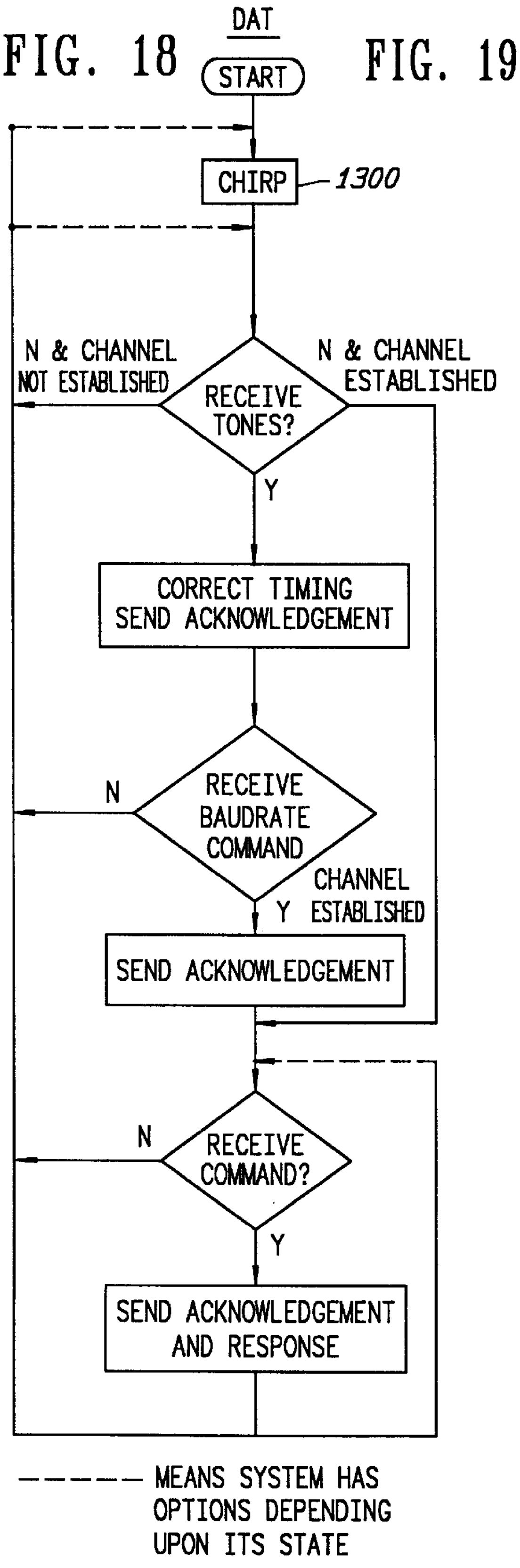
FIG. 18 is a flow chart depicting the synchronization process of the downhole acoustic transceiver portion of the preferred embodiment of FIG. 17.
Figure 19:
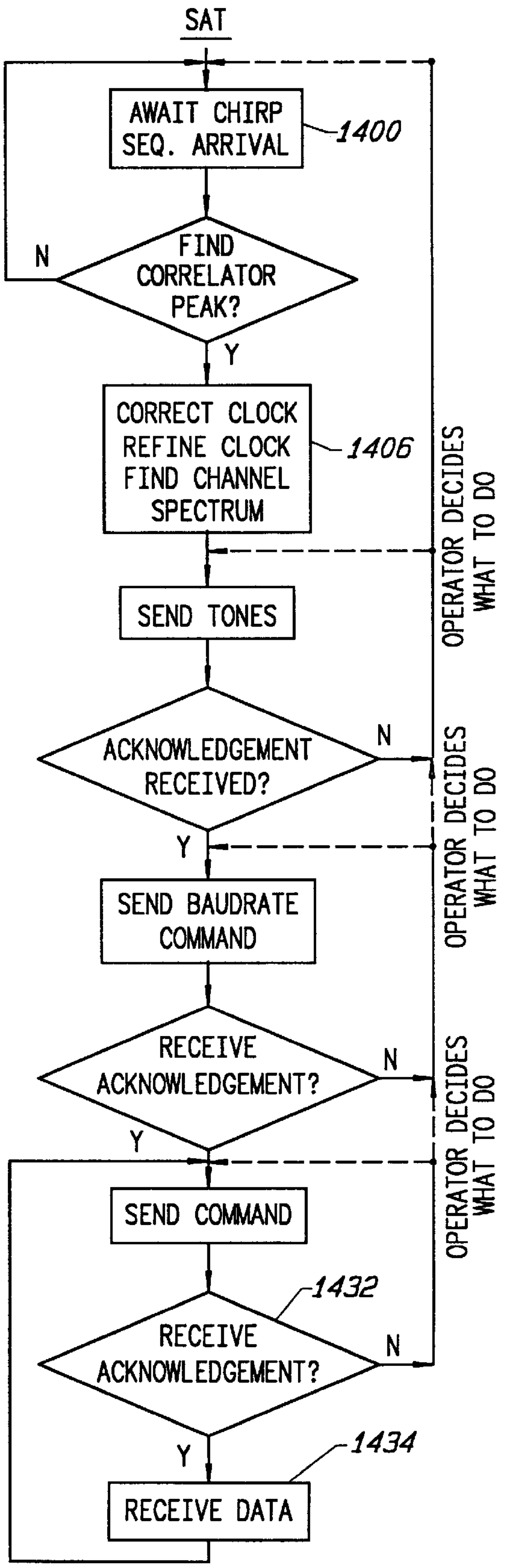
FIG. 19 is a flow chart depicting the synchronization process of the surface acoustic transceiver portion of the preferred embodiment of FIG. 2.

FIG. 18 and FIG. 19 are flow charts of the DAT and SAT operations, respectively. The chirp sequences are generated during step 1300. Prior to the first chirp pulse being transmitted after the selected time delay, the surface transceiver awaits the arrival of the chirp sequences in accordance with step 1400 in FIG. 19. The DAT is programmed to transmit a burst of chirps every two minutes until it receives two tones: fc and fc+1. Initial synchronization starts after a "characterize channel" command is issued at the host computer. Upon receiving the "characterize channel" command, the SAT starts digitizing transducer data. The raw transducer data is conditioned through a chain of amplifiers, anti-aliasing filters, and level translators, before being digitized. One second data block (1024 samples) is stored in a buffer and pipelined for subsequent processing.

The functions of the chirp correlator are threefold. First, it synchronizes the SAT TX/RX clock to that of the DAT. Second, it calculates a clock error between the SAT and DAT timebases, and corrects the SAT clock to match that of the DAT. Third, it calculates a one Hertz resolution channel spectrum.

The correlator performs a FFT ("Fast Fourier Transform") on a 0.25 second data block, and retains FFT signal bins between one hundred and forty Hertz to three hundred and sixty Hertz. The complex valued signal is added coherently to a running sum buffer containing the FFT sum over the last six seconds (24 FFTs). In addition, the FFT bins are incoherently added as follows: magnitude squared, to a running sum over the last 6 seconds. An estimate of the signal to noise ratio (SNR) in each frequency bin is made by a ratio of the coherent bin power to an estimated noise bin power. The noise power in each frequency bin is computed as the difference of the incoherent bin power minus the coherent bin power. After the SNR in each frequency bin is computed, an "SNR sum" is computed by summing the individual bin SNRs. The SNR sum is added to the past twelve and eighteen second SNR sums to form a correlator output every 0.25 seconds and is stored in an eighteen second circular buffer. In addition, a phase angle in each frequency bin is calculated from the six second buffer sum and placed into an eighteen second circular phase angle buffer for later use in clock error calculations.

After the chirp correlator has run the required number of seconds of data through and stored the results in the correlator buffer, the correlator peak is found by comparing each correlator point to a noise floor plus a preset threshold. After detecting a chirp, all subsequent SAT activities are synchronized to the time at which the peak was found.

After the chirp presence is detected, an estimate of sampling clock difference between the SAT and DAT is computed using the eighteen second circular phase angle buffer. Phase angle difference (m$\phi$) over a six second time interval is computed for each frequency bin. A first clock error estimation is computed by averaging the weighted phase angle difference over all the frequency bins. Second and third clock error estimations are similarly calculated respectively over twelve and one hundred and eighty-five second time intervals. A weighted average of three clock error estimates gives the final clock error value. At this point in time, the SAT clock is adjusted and further clock refinement is made at the next two minute chirp interval in similar fashion.

After the second clock refinement, the SAT waits for the next set of chirps at the two minute interval and averages twenty-four 0.25 second chirps over the next six seconds. The averaged data is zero padded and then FFT is computed to provide one Hertz resolution channel spectrum. The surface system looks for a suitable transmission frequency in the one hundred and fifty Hertz to three hundred and fifty Hertz. Generally, a frequency band having a good signal to noise ratio and bandwidths of approximately two Hertz to forty Hertz is acceptable. A width of the available channel defines the acceptable baud rate.

The second phase of the initial communication process involves establishing an operational communication link between the SAT 1204 and the DAT 1202. Toward this end, two tones, each having a duration of two seconds, are sequentially sent to the DAT 1202. One tone is at the chosen center frequency and the other is offset from the center frequency by exactly one hertz. This step in the operation of the SAT 1204 is represented by block 1406 in FIG. 19.

The DAT is always looking for these two tones: fc and fc+1, after it has stopped chirping. Before looking for these tones, it acquires a one second block of data at a time when it is known that there is no signal. The noise collection generally starts six seconds after the chirp ends to provide time for echoes to die down, and continues for the next thirty seconds. During the thirty second noise collection interval, a power spectrum of one second data block is added to a three second long running average power spectrum as often as the processor can compute the 1024 point (one second) power spectrum.

The DAT starts looking for the two tones approximately thirty-six seconds after the end of the chirp and continues looking for them for a period of four seconds (tone duration) plus twice the maximum propagation time. The DAT again calculates the power spectrum of one second blocks as fast as it can, and computes signal to noise ratios for each one Hertz wide frequency bins. All the frequency components which are a preset threshold above a noise floor are possible candidates. If a frequency is a candidate in two successive blocks, then the tone is detected at its frequency. If the tones are not recognized, the DAT continues to chirp at the next two minute interval. When the tones are received and properly recognized by the DAT, the DAT transmits the same two tones back to the SAT at the selected carrier frequency fc, which is recognized as an acknowledgement signal. Then, the SAT transmits characters to the DAT, which causes the DAT to look for a coded "recognition sequence signal". Control data follows the recognition signal. Preferably, the recognition sequence signal includes a baud rate signal which identifies to the DAT the expected baud rate, as determined by the SAT. The DAT will then respond to any command provided to it after the recognition sequence signal. Typically, the SAT will command the DAT to begin the transmission of data from the downhole location for receipt by the SAT at the uphole location.

Figure 23:
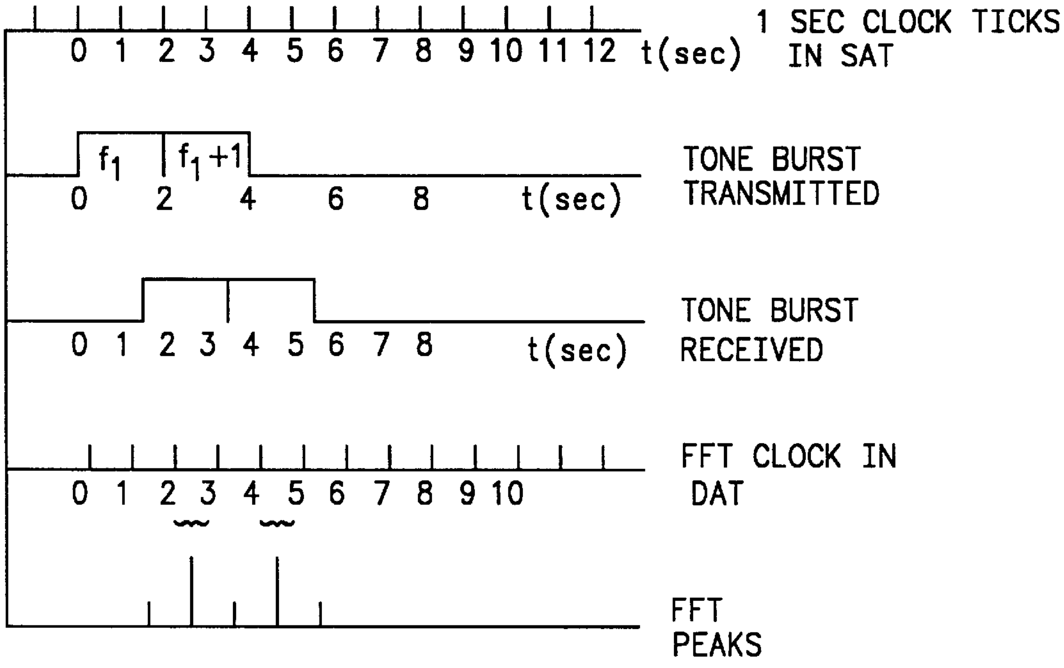
FIG. 23 depicts the second synchronization signals and the resultant correlation signals.

A by-product of the process of recognizing the tones is that it enables the DAT to synchronize its internal clock to the surface transceiver's clock. Using the SAT clock as the reference clock, the tone pair can be said to begin at time t=0. Also assume that the clock in the surface transceiver produces a tick every second as depicted in FIG. 23. This alignment is desirable to enable each clock to tick off seconds synchronously and maintain coherency for accurately demodulating the data. However, the DAT is not sure when it will receive the pair, so it conducts an FFT every second relative to its own internal clock which can be assumed not to be aligned with the surface clock. When the four seconds of tone pair arrive, they will more than likely cover only three one second FFT interval fully and only two of those will contain a single frequency. FIG. 23 is helpful in visualizing this arrangement. Note that the FFT periods having a full one second of tone signal located within it will produce a maximum FFT peak.

Once received, an FFT of each two second tone produces both amplitude and phase components of the signal. When the phase component of the first signal is compared with the phase component of the second signal, the one second ticks of the downhole clock can be aligned with the surface clock. For example, a two hundred Hertz tone followed immediately by a two hundred and one Hertz tone is sent from the transceiver at time t=0. Assume that the propagation delay is one and one-half seconds and the difference between the one second ticking of the clocks is 0.25 seconds. This interval is equivalent to three hundred and fifty cycles of two hundred Hertz Hz signal and 351.75 cycles of two hundred and one Hertz tone. Since an even number of cycles has passed for the first tone, its phase will be zero after the FFT is accomplished. However, the phase of the second tone will be two hundred and seventy degrees from that of the first tone. Consequently, the difference between the phases of each tone is two hundred and seventy degrees which corresponds to an offset of 0.75 seconds between the clocks. If the DAT adjusts its clock by 0.75 seconds, the one second ticks will be aligned. In general, the phase difference defines the time offset. This offset is corrected in this implementation. The timing correction process is represented by step 1308 in FIG. 18 and is accomplished by the software in the DAT, as represented by blocks 1504, 1506, 1508 in the DAT block diagram of FIG. 21.

It should be noted that the tones are generated in both the DAT and SAT in the same manner as the chirp signals were generated in the DAT. As described previously, in the preferred embodiment of the invention, a microprocessor controlled digital signal generator 1500, 1628 creates a pulse stream of any frequency in the band of interest. Subsequent to generation, the tones are converted into a three level signal at 1502, 1630 for transmission by the transducer 1200, 1205 through the acoustic channel.

After tone recognition and retransmission, the DAT adjusts its clock, then switches to the Minimum Shift Keying (MSK) modulation receiving mode. (Any modulation technique can be used, although it is preferred that MSK be used for the invention for the reasons discussed below.) Additionally, if the tones are properly recognized by the SAT as being identical to the tones which were sent (step 1408), it transmits a MSK modulated command instructing the DAT as to what baud rate the downhole unit should use to send its data to achieve the best bit energy to noise ratio at the SAT (step 1410). The DAT is capable of selecting 2 to 40 baud in 2 baud increments for its transmissions. The communication link in the downhole direction is maintained at a two baud rate, which rate could be increased if desired. Additionally, the initial message instructs the downhole transceiver of the proper transmission center frequency to use for its transmissions.

If, however, the tones are not received by the downhole transceiver, it will revert to chirping again. SAT did not receive the two tone acknowledgement signal since DAT did not transmit them. In this case the operator can either try sending tones however many times he wants to or try recharacterizing channel which will essentially resynchronize the system. In the case of sending two tones again, SAT will wait until the next tone transmit time during which the DAT would be listening for the tones.

If the downhole transceiver receives the tones and retransmits them, but the SAT does not detect them, the DAT will have switched to this MSK mode to await the MSK commands, and it will not be possible for it to detect the tones which are transmitted a second time, if the operator decides to retransmit rather than to recharacterize. Therefore, the DAT will wait a set duration. If the MSK command is not received during that period, it will switch back to the synchronization mode and begin sending chirp sequences every two minutes. This same recovery procedure will be implemented if the established communication link should subsequently deteriorate.

As previously mentioned, the commands are modulated in an MSK format. MSK is a form of modulation which, in effect, is binary frequency shift keying (FSK) having continuous phase during the frequency shift occurrences. As mentioned above, the choice of MSK modulation for use in the preferred embodiment of the invention should not be construed as limiting the invention. For example, binary phase shift keying (BPSK), quadrature phase shift keying (QPSK), or any one of the many forms of modulation could be used in this acoustic communication system.

In the preferred embodiment, the commands are generated by the host computer 1128 as digital words. Each command is encoded by a cyclical redundancy code (CRC) to provide error detection and correction capability. Thus, the basic command is expanded by the addition of the error detection bits. The encoded command is sent to the MSK modulator portion of the 68HC11 microprocessor's software. The encoded command bits control the same digital frequency generator 1628 used for tone generation to generate the MSK modulated signals. In general, each encoded command bit is mapped, in this implementation, onto a first frequency and the next bit is mapped to a second frequency. For example, if the channel center frequency is two hundred and thirteen Hertz, the data may be mapped onto frequencies two hundred and eighteen Hertz, representing a "1", and two hundred and eight Hertz, representing a "0". The transitions between the two frequencies are phase continuous.

Upon receiving the baud rate command, the DAT will send an acknowledgement to the SAT. If an acknowledgement is not received by the SAT, it will resend the baud rate command if the operator decides to retry. If an operator wishes, the SAT can be commanded to resynchronize and recharacterize with the next set of chirps.

A command is sent by the SAT to instruct the DAT to begin sending data. If an acknowledgement is not received, the operator can resend the command if desired. The SAT resets and awaits the chirp signals if the operator decides to resynchronize. However, if an acknowledgement is sent from the DAT, data are automatically transmitted by the DAT directly following the acknowledgement. Data are received by the SAT at the step represented at 1434.

Nominally, the downhole transceiver will transmit for four minutes and then stop and listen for the next command from the SAT. Once the command is received, the DAT will transmit another 4 minute block of data. Alternatively, the transmission period can be programmed via the commands from the surface unit.

It is foreseeable that the data may be collected from the sensors 1201 in the downhole package faster than they can be sent to the surface. Therefore, as shown in FIG. 21, the DAT may include buffer memory 1510 to store the incoming data from the sensors 1201 for a short duration prior to transmitting it to the surface.

The data is encoded and MSK modulated in the DAT in the same manner that the commands were encoded and modulated in the SAT, except the DAT may use a higher data rate: two to forty baud, for transmission. The CRC encoding is accomplished by the microprocessor 1512 prior to modulating the signals using the same circuitry 1500 used to generate the chirp and tone bursts. The MSK modulated signals are converted to tri-state signals 1502 and transmitted via the transducer 1200.

In both the DAT and the SAT, the digitized data are processed by a quadrature demodulator. The sine and cosine waveforms generated by oscillators 1635, 1636 are centered at the center frequency originally chosen during the synchronization mode. Initially, the phase of each oscillator is synchronized to the phase of the incoming signal via carrier transmission. During data recovery, the phase of the incoming signal is tracked to maintain synchrony via a phase tracking system such as a Costas loop or a squaring loop.

The I and Q channels each use finite impulse response (FIR) low pass filters 1638 having a response which approximately matches the bit rate. For the DAT, the filter response is fixed since the system always receives thirty-two bit commands. Conversely, the SAT receives data at varying baud rates; therefore, the filters must be adaptive to match the current baud rate. The filter response is changed each time the baud rate is changed.

Subsequently, the I/Q sampling algorithm 1640 optimally samples both the I and Q channels at the apex of the demodulated bit. However, optimal sampling requires an active clock tracking circuit, which is provided. Any of t he many traditional clock tracking circuits would suffice: a tau-dither clock tracking loop, a delay-lock tracking loop, or the like. The output of the I/Q sampler is a stream of digital bits representative of the information.

The information which was originally transmitted is recovered by decoding the bit stream. To this end, a decoder 1642 which matches the encoder used in the transmitter process: a CRC decoder, decodes and detects errors in the received data. The decoded information carrying data is used to instruct the DAT to accomplish a new task, to instruct the SAT to receive a different baud rate, or is stored as received sensor data by the SAT's host computer.

The transducer, as the interface between the electronics and the transmission medium, is an important segment of the current invention; therefore, it was discussed separately above. An identical transducer is used at each end of the communications link in this implementation, although it is recognized that in many situations it may be desirable to use differently configured transducers at the opposite ends of the communication link. In this implementation, the system is assured when analyzing the channel that the link transmitter and receiver are reciprocal and only the channel anomalies are analyzed. Moreover, to meet the environmental demands of the borehole, the transducers must be extremely rugged or reliability is compromised.

Figure 24:
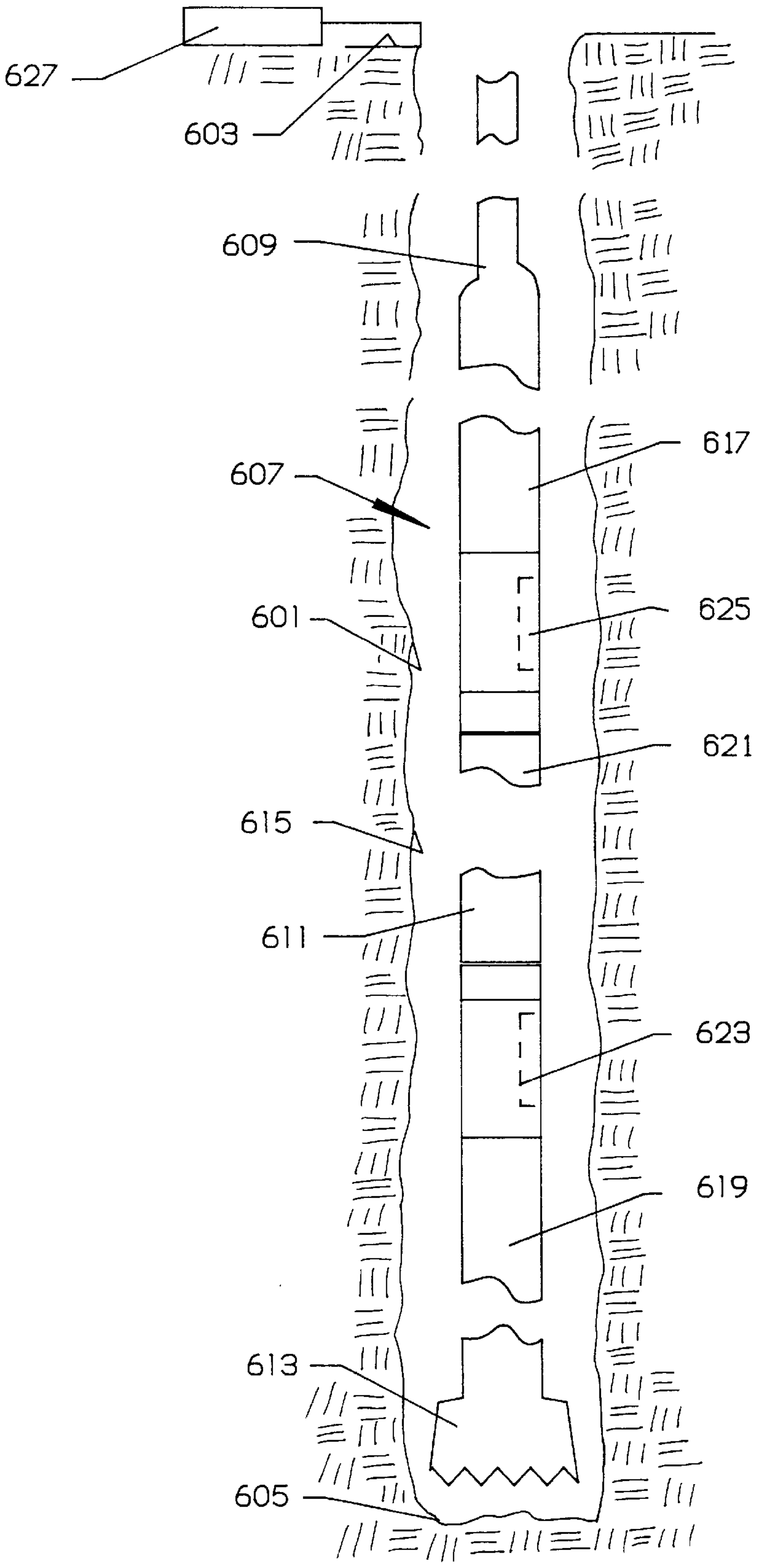
FIG. 24 depicts the utilization of the transducer and communication system in the present invention in a drillstring during drilling operations to transmit data between selected locations in the drillstring.

The Measurement-While-Drilling Application:

In the foregoing description, the transducer and communication system are described as being used in a producing wellbore. However, the transducer and communication system can also be utilized in a wellbore during completion operations or drilling operations. FIG. 24 shows one such utilization of the transducer and communication system during drilling operations. As is shown, wellbore 601 extends from surface 603 to bottom hole 605. Drillstring 607 is disposed therein, and is composed of a section of drill pipe 609 and a section of drill collar 611. The drill collar 611 is located at the lowermost portion of drillstring 607, and terminates at its lowermost end at rockbit 613. As is conventional, during drilling operations, fluid is circulated downward through drillstring 607 to cool and lubricate drillbit 613, and to wash formation cuttings upward through annulus 615 of wellbore 601.

Typically, one of two types of drillbits are utilized for drilling operations, including: (a) a rolling-cone type drillbit, which requires that drillstring 607 be rotated at surface 603 to cause disintegration of the formation at bottom hole 605, and (b) a drag bit which includes cutters which are disposed in a fixed position relative to the bit, and which is rotated by rotation of drillstring 607 or by rotation of a portion of drill collar 611 through utilization of a motor.

In either event, a fluid column exists within drillstring 607, and a fluid column exists within annulus 615 which is between drillstring 607 and wellbore 601. It is common during conventional drilling operations to utilize a measurement-while-drilling data transmission system which impresses a series of either positive or negative pressure pulses upon the fluid within annulus 615 to communicate data from drill collar section 611 to surface 603. Typically, a measurement-while-drilling data transmission system includes a plurality of instruments for measuring drilling conditions, such as temperature and pressure, and formation conditions such as formation resistivity, formation gamma ray discharge, and formation dielectric properties. It is conventional to utilize measurement-while-drilling systems to provide to the operator at the surface information pertaining to the progress of the drilling operations as well as information pertaining to characteristics or qualities of the formations which have been traversed by rockbit 613.

In FIG. 24, measurement-while-drilling subassembly 617 includes sensors which detect information pertaining to drilling operations and surrounding formations, as well as the data processing and data transmission equipment necessary to coherently transmit data from drill collar 611 to surface 603.

A great need exists in the drilling industry for additional information, and in particular information which can be characterized as "near-drillbit" information. This is particularly true for drilling configurations which utilize steering subassemblies, such as steering subassembly 621, which allow for the drilling of directional wells. The utilization of steering equipment ensures that the measurement-while-drilling data gathering and transmission equipment is located thirty to sixty (30–60) feet from drill bit 613. Directional turns of drillbit 613 cannot be accurately monitored and controlled utilizing the sensing and data transmission equipment of measurement-while-drilling system 617; near drillbit information would be required in order to have a higher degree of control. Some examples of desirable near drillbit data include: inclination of the lowermost portion of the drilling subassembly, the azimuth of the lowermost portion of the drilling subassembly, drillbit temperature, mud motor or turbine rpm, natural gamma ray readings for freshly drilled formations near the bit, resistivity readings for freshly drilled formations near the bit, the weight on the bit, and the torque on the bit.

In the present invention, measurement subassembly 619 is located adjacent rockbit 613, and includes a plurality of conventional instruments for measuring near drillbit data such as inclination, azimuth, bit temperature, turbine rpm, gamma ray activity, formation resistivity, weight on bit, and torque on bit, etc. This information may be digitized and multiplexed in a conventional fashion, and directed to acoustic transducer 623 which is located in an adjacent subassembly for transmission to receiver 625, which is located upward within the string, and which is adjacent measurement-while-drilling subassembly 617. In this configuration, near-drillbit data may be transmitted a short distance (typically thirty to ninety feet) between transmitter 623 and receiver 625 which utilize the transducer of the present invention as well as the communication system of the present invention.

The communication system of the present invention continually monitors the fluid within annulus 615 with a characterization signal to identify the optimum frequencies for communication, as was discussed above. The data may be routed from receiver 625 to measurement-while-drilling system 617 for storage, processing, and retransmission to surface 603 utilizing conventional measurement-while-drilling data transmission technologies. This provides an economical and robust data communication system for the dynamic and noisy environment adjacent drill collar section 611, which allows communication of near-drillbit data for integration into a conventional data stream from a measurement-while-drilling data communication system.

Alternatively, or additionally, transducer 627 may be provided at surface 603 for receipt of acoustic data signals from either one or both of transducer 623 or transducer 625. Or, alternatively, and more likely, transducer 625 may be utilized to transmit to an intermediate transducer located in the drillpipe section 609 of the drillstring 611 which will be able to transmit a greater distance than transducers located in the drill collar section 611. In this manner, the transducers and communication system of the present invention may be utilized as a data transmission system which is parallel with a conventional measurement-while-drilling data transmission system. This is particularly useful, since conventional measurement-while-drilling systems require the continuous flow of fluid downward through drillstring 607. During periods of noncirculation or if circulation is lost, conventional measurement-while-drilling systems cannot communicate data from wellbore 601 to surface 603, since no fluid is flowing. The transducer and communication system of the present invention provide a redundant system which can be utilized to transmit data to surface 603 during quiescent periods when no fluid is being circulated within the wellbore. This provides considerable advantages since there are significant periods of time during which data communication is not possible during drilling operations utilizing conventional measurement-while-drilling technologies. In alternative embodiments, the transducer and communication system of the present invention can be utilized to completely replace a conventional measurement-while-drilling data transmission system, and provide a sole mechanism for the communication of data and control systems within the wellbore during drilling operations.

The Gas Influx Detection Application:

The transducer and communication system of the present invention can also be utilized during drilling operations for the detection of the undesirable influx of high pressure gas into the annulus of a wellbore. As is known to those skilled in the art, the introduction of high pressure gas into the fluid column of a wellbore during drilling operations can result in loss of control of the well, or even a "blowout" in the most extreme situations. Considerable effort has been expended to provide safety equipment at the wellhead which can be utilized to prevent the total loss of control of a well. Once a drilling operator has determined that an influx of gas is likely to have occurred, remedial actions can be taken to lessen the impact of the gas influx. Such remedial actions include increasing or decreasing circulation within the well, or increasing the viscosity and density of the drilling fluid within the well. Finally, safety equipment can be utilized to prevent total loss of control within a wellbore due to a significant gas influx. The prior art technology is entirely inadequate in providing sufficient data to the operator during drilling operations which would allow the operator to avoid the many problems associated with gas influx. Fortunately, the transducer and communication system of the present invention can be utilized in drilling operations to provide the operator with significant data pertaining to (1) whether an undesirable influx of gas has occurred, and (2) the location of the gas "bubble" once it has entered the drilling fluid column. It is important to note that an influx usually occurs as an introduction of a fluid slug, which is the gas in liquified form due to the high pressure exerted by the fluid column. Since the gas generally has a lower density, it will rise within the fluid column; as it rises, it will come out of solution, and take the form of a gas "bubble".

In accordance with the present invention, an influx of gas can be detected in a fluid column within a wellbore which defines a communication channel by performing the following steps:

(1) at least one actuator is provided in communication with the wellbore for conversion of at least one of (a) a provided coded electrical signal to a corresponding generated coded acoustic signal during a message transmission mode of operation, and (b) a provided coded acoustic signal to a corresponding generated coded electrical signal during a message reception mode of operation; preferably, only one actuator/transducer is provided, and this is located at the surface of the wellbore at the wellhead, and is in fluid communication with the fluid column within the annulus of the wellbore, although in alternative embodiments one or more transducers may be provided downhole within the drillstring;

(2) the transducer is utilized to generate an interrogating signal at a selected location within the wellbore; the characterizing signal may be a "chirp" which includes a plurality of signal components, each having a different frequency, and spanning over a preselected range of frequencies, or it may be an acoustic signal which includes only a single frequency component;

(3) the transducer is utilized to apply the interrogating signal to the communication channel which is defined, preferably, in the fluid column within the wellbore annulus;

(4) the interrogating signal is transmitted through the communication channel and is received by either a different transducer, or is echoed back upward through the communication channel and received by the transmitting transducer;

(5) next, the interrogating signal is analyzed to identify at least one of the following: (a) portions of a preselected range of frequencies which are suitable for communicating data in the wellbore; these portions may be identified by either frequency or bandwidth or both, or by signal-to-noise characteristics such as a signal-to-noise ratio, or signal amplitude; (b) communication channel attributes, such as communication channel length, or communication channel impedance; (c) signal attributes, such as signal amplitude, signal phase, and the occurrence of loss of the signal;

(6) Finally, the steps of utilizing, applying, receiving, and analyzing are repeated periodically to identify changes in at least one of: (a) portions of the preselected range of frequencies which are suitable for communicating data in the wellbore including frequency changes, bandwidth changes, changes in a signal-to-noise characteristic, changes in signal amplitude of signals transmitted within the portion, and signal time delays for signals transmitted within the portion, (b) communication channel attributes, including changes in communication channel length or communication channel impedance, or (c) changes in signal attributes (either interrogating signals or subsequent signals) including changes in signal amplitude, changes in signal phase, loss of signal, or signal time delay.

When a single transducer is utilized, in the preferred embodiment of the present invention, such transducer should be located at the surface, and should be utilized to transmit a signal downward within the communication channel (of the annulus). Typically, the acoustic signal is reflected off of the drill collar portion of the drillstring, and thus travels back upward through the communication channel where it is received by the transducer which generated the signal. In fact, any signal provided by the surface transducer will travel a multiple number of times downward and then upward within the communication channel as the signal repeatedly reflects off of the drill collar portion of the drillstring. In one embodiment of the present invention, one or more acoustic markers may be placed within the drillstring at selected locations. Each member is generally larger in diameter than the adjoining drillstring, and provides a reflection surface at one or more known distances. The reflection of acoustic signals off of these markers is monitored for changes which indicate its presence of gas.

Figure 25:
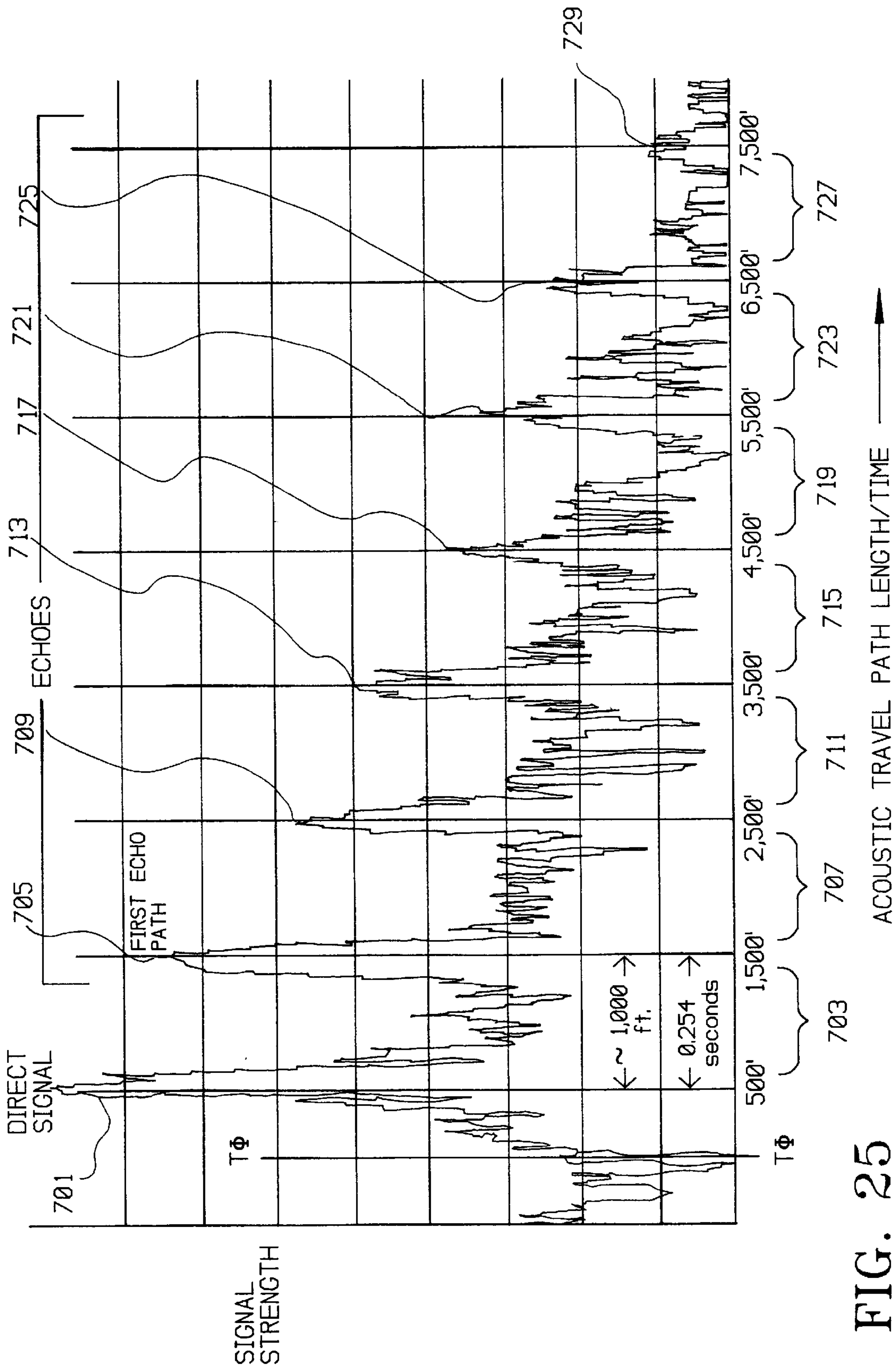
FIGS. 25 and 26 are utilized to illustrate the application of the transducer and communication system of the present invention during drilling operations for the purpose of identifying and detecting the influx of gas into a wellbore fluid column.

FIG. 25 graphically depicts a laboratory test of the transducer of the present invention in a wellbore five hundred (500) feet deep. In this figure, the X-axis is representative of the acoustic travel path in units of time, which have been normalized to units of length, and the Y-axis is representative of signal strength of the signal received by the transducer which is disposed at the surface. Peak 701 is representative of a signal which is generated by the surface acoustic transceiver. At the termination of time interval 701, the first echo 705 is detected by the surface acoustic transceiver. During this time interval, the acoustic signal has traveled downward through the annulus, reflected from the drill collar, and traveled back upward to the surface acoustic transceiver for reception. At the termination of time interval 707, the second acoustic signal 709 is received by the surface acoustic transceiver. At the termination of time interval 711, the third acoustic echo 713 is received by the surface acoustic transceiver. At the termination of time interval 715, the fourth acoustic echo 717 is received by the surface acoustic transceiver. At the termination of time interval 717, the fifth echo 719 is received by the surface acoustic transceiver. At the termination of time interval 721, the sixth echo 723 is detected by the surface acoustic transceiver. At the termination of time interval 725 the seventh echo 727 is detected by the surface acoustic transceiver.

Thus, it can be seen that if the annulus is unobstructed, a regular pattern of echoes can be expected for acoustic signals emitted by the surface acoustic transceiver. Each echo occurs at a predetermined time on a time line, which corresponds to the distance between the surface acoustic transceiver and the drill collar portion of the drillstring. Since the length of the drillstring is known, and the frequency of transmission of the acoustic signal is also known, the echoes occur as expected, unless an obstruction exists within the annulus of the wellbore.

An influx of gas into the annulus can serve as an obstruction which will cause the occurrence of echoes to be shifted in time. This occurs, since the gas "slug" or "bubble" has different acoustic transmission properties from the drilling mud, and will provide a boundary from which reflection is expected. Thus, the generation of an acoustic signal by the surface acoustic transceiver, and subsequent monitoring of the return echoes, can be utilized to detect (1) the presence of a gas influx, and (2) the location of a gas influx. Assume for example that a gas bubble has entered the annulus during drilling operations, and is located at a position midway between the surface acoustic transceiver and the drill collar. The expected result is an echo pattern which indicates a travel path of approximately one-half of that which was previously encountered during monitoring. The operator at the surface can analyze the echo pattern and thus determine the presence and location of the gas bubble.

In addition to monitoring the length of the communication channel, the transducer and communication system of the present invention may be utilized to detect the influx of gas by monitoring the extent of amplitude attenuation in the echo signals as compared to amplitude attenuation during periods of operation during which no gas influx is present within the communication channel; said monitoring is preferably not a calibrated measurement but is instead a relative comparison of attenuation and the description which follows utilizes the term "amplitude attenuation" in this sense. With reference again to FIG. 25, the presence of undesirable gas bubbles within the fluid column which comprises a communication channel will result in a change in acoustic impedance of the fluid column and will result in additional reflection losses. This change in acoustic impedance of the fluid column will result in a change in the amplitude attenuation of the signal as it echoes within the wellbore by traveling downward and upward. For example, if a large amount of gas is present within the communication channel, a greater or lesser degree of signal attenuation may be observed than is normally encountered during periods of operation during which no gas is present within the communication channel. Therefore, by continuously monitoring and comparing attenuation values, the transducer of the present invention can be utilized to detect changes in acoustic impedance which occur due to the influx of gas within the communication channel. Any detected change in communication channel length or impedance can be considered to be detection of changes in "communication channel attributes".

Signals which are transmitted from the transducer can be monitored for changes in amplitude, or significant time delays, both of which could indicate the presence of an undesirable gas influx. Additionally, signals which have been transmitted by the transducer can be monitored for signal phase shift, which in an acoustic transmission environment corresponds to significant transmission delays (which are far greater than one wavelength).

Figure 26:
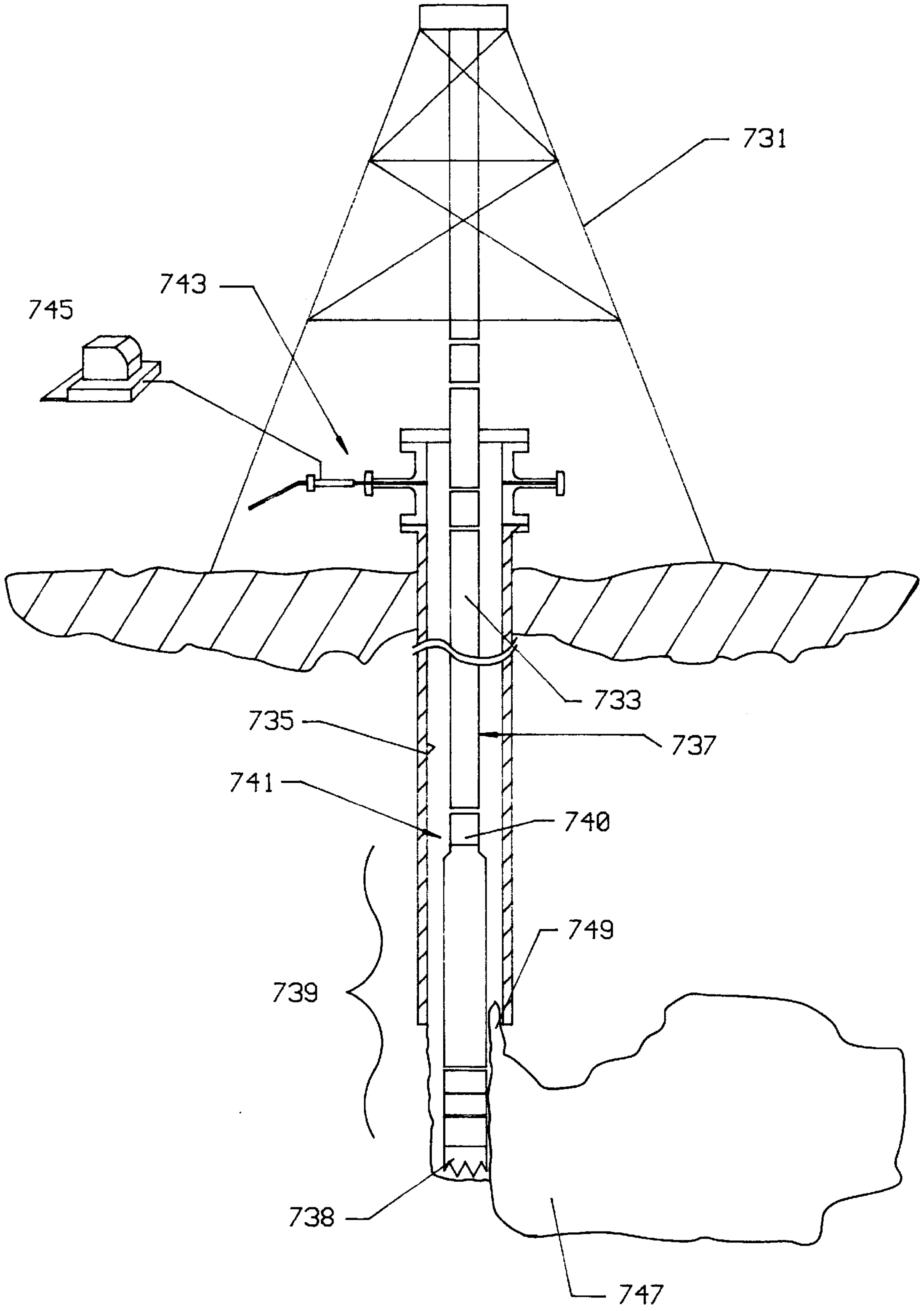

The transducer and communication system of the present invention may also be utilized during a gas influx detection mode of operation, wherein the process of selection of the one or more portions of available bandwidth for data communication is utilized to detect changes in the communication channel which indicate that a gas influx has occurred. As is shown in FIG. 26, surface acoustic transceiver 743 may be coupled in a position at the surface to communicate with annulus fluid 741 within wellbore 735. Drilling rig 731 is provided to rotate drillstring 733. As is conventional, drillstring 733 includes an upper section of drill pipe 737 and a lower section of drill collar 739. Rockbit 738 disintegrates geologic formations as drillstring 733 is rotated relative to wellbore 735.

During selected portions of the drilling operations, surface acoustic transceiver 743 (and associated personal computer monitor 745) is utilized to transmit interrogating signals downward into wellbore 735 through annulus fluid 741, which is the communication channel. One or more reflection markers may be provided and coupled in position within drill pipe section 737 of drillstring 733. Alternatively, the reflective boundary provided by drill collar 739 may be utilized as a reflection surface. Surface acoustic transceiver 743 transmits either (a) a signal which includes a number of signal components, each having a different frequency, spanning a preselected frequency range, or (b) transmits a signal having a fixed frequency. The signal is propagated downward through annulus fluid 741, and reflects off of drill collar 739, and returns toward the surface for reception by surface acoustic transceiver 743.

If a signal is transmitted which includes a number of different frequency components, the surface acoustic transceiver can analyze the signal-to-noise attributes of various frequency portions over the preselected frequency range to identify one or more optimal bands within the frequency range, typically each being approximately ten (10) Hertz wide, which are optimal at that time for the communication of data within wellbore 735. The particular optimal bands may be identified by upper and lower frequencies, or a center frequency and a bandwidth. In either characterization, a specific portion of a frequency range is identified as being preferable to other portions of the frequency range for the efficient transmission of data.

The introduction of an undesirable gas influx into the annulus fluid 741 within wellbore 735 will alter the acoustic impedance of the annulus fluid 741, and thus will alter the optimal frequency portions for data transmission. Data can be obtained by continually characterizing the communication channel of annulus fluid 741 during periods in which no gas influx is present within annulus fluid 741. Subsequent characterizations of annulus fluid 741 can be compared to the historical data to identify changes in the optimal bandpass portions of the preselected frequency range to identify the occurrence of a gas influx.

In FIG. 26, rockbit 738 is depicted as traversing a high pressure gas zone 747. This causes a gas influx 749 to enter annulus fluid 741. Typically, gas influx 749 will enter annulus fluid 741 as a "slug" of fluid. As it rises, it will come out of solution and become a gas "bubble". The presence of either the fluid slug or the gas bubble should cause a significant change in the optimal operating frequencies for the communication channel of annulus fluid 741. These abrupt changes in the optimal data transmission frequencies should provide an indication to the operator at the surface that an undesirable gas influx has occurred.

In alternative embodiments, one or more transducers may be located within drillstring 733 for the transmission and/or reception of acoustic signals. For example, downhole acoustic transceiver 740 may be provided in a position adjacent drill collar 739 for the receipt or transmission of acoustic signals. In this configuration, downhole acoustic transceiver 740 may be utilized, as was described above in connection with the description of the data communication system, to generate a characterizing signal which is detected by surface acoustic transceiver 741, and processed by PC monitor 745, also as was described above. Surface acoustic transceiver 743 and downhole acoustic transceiver 740 may be utilized to transmit signals back and forth across the communication channel of annulus fluid 741. Changes in the communication channel, changes in signals transmitted between surface acoustic transceiver 741 and downhole acoustic transceiver 740, as well as changes in the optimal communication frequencies can be utilized to detect the entry of an undesirable gas influx 749. Echoes which are generated within the communication channel of annulus fluid 741 which originate from either the surface acoustic transceiver 743 or the downhole acoustic transceiver 740 can be utilized to pinpoint the location and size of a gas bubble as it travels upward within the annulus of the wellbore.

The present invention can be utilized to monitor gas influx into a well during drilling, and detect the event prior to the influx bubble reaching the surface. This will greatly improve safety, by preventing blowout of the well or other serious loss of control situations. The system can be utilized to detect the position of the top of the bubble. Since the transducer and communication system of the present invention does not require that circulation be present within the wellbore, the present invention can be utilized to detect the influx of gas during quiescent periods during which no fluid is being circulated within the wellbore, such as tripping and casing operations. The present invention also allows for the detection of small gas bubbles, far earlier than is capable under conventional techniques. The present invention also allows for significant changes to occur in the well during drilling operations, such as changes in mud weight, and the subtraction or addition of drillstring sections, since the system allows for continuous monitoring of the communication channel to determine optimum operating frequencies. This feature allows for the automatic and continuous adjustment of the "baseline" performance during significant reconfigurations of the wellbore, without requiring any significant knowledge by the operator of acoustic systems. In short, altered acoustic paths, disrupted acoustic returns, disrupted frequency channels, and changes in the time of flight as well as changes in amplitude relative to previous amplitudes can be utilized separately or together to identify the occurrence of an undesirable gas influx, and once the influx has been detected, can be utilized to pinpoint the location, and perhaps size, of the gas influx.

Alternative Data Communication System:

As an alternative to identifying specific and narrow portions of a frequency band which provide optimal data transmission, the communication system of the present invention can utilize an opposite approach which utilizes a very broad band in its entirety to transmit a corresponding binary character, such as a binary one, and which uses another broad band to identify a corresponding binary character, such as a binary zero. It has been shown by Drumheller, in an article entitled "Acoustical Properties of Drillstrings", Sandia National Laboratories, Paper No. SAND88-0502, published in August of 1988, that acoustical signals of specific frequencies travel from the bottom of a drillstring to the surface with only small attenuation. These frequencies are contained within frequency bands. Within these frequency bands there can be wide variation of the attenuation of any one particular frequency, but some or most of the frequencies within the band pass through the drillstring notwithstanding dramatic changes in the wellbore environment. Thus, selecting one particular frequency band as the modulation frequency for a data transmission system ensures that there is only a small probability that all frequencies within the band will be attenuated and lost.

In accordance with the present invention, the communication channel is in the wellbore, either a fluid column or a tubular member, is analyzed to determine an optimal frequency band which may be utilized to designate a particular binary value, such as a binary "one", while another separate frequency band is identified to represent the opposite binary character, such as a binary "zero". For example, the communication channel is investigated to identify a broad frequency band, such as five hundred ninety Hertz to six hundred and ninety Hertz (590–690) which corresponds to a binary "one", while it also investigated for a separate frequency band, such as eight hundred and twenty Hertz to nine hundred and twenty Hertz (820–920) which corresponds to a binary "zero".

The transducers of the present invention are utilized to generate an acoustical signal which includes a plurality of signal portions, each portion representing a different frequency within the band, the portions altogether spanning the entire width of the selected frequency band. For example, for the binary one, the acoustic transducer will produce a signal which includes a plurality of signal components spread across the five hundred ninety to six hundred ninety (590–690) bandwidth. Likewise, for the binary "zero", the transducer will generate an acoustical signal which includes a plurality of signal components which span the range of frequencies between eight hundred and twenty Hertz and nine hundred and twenty Hertz (820–920).

During a reception mode of operation, the transducer, and associated microprocessor computer, is utilized to analyze the energy levels of acoustic signals detected in the separate frequency band ranges. Preferably, the energy of the zero band is compared to a baseline noise level which has previously been obtained for the range of frequencies. Likewise, the energy level of the frequency range representative of the binary "zero" is compared with a baseline energy level previously acquired for the same frequency range.

Figure 27B:
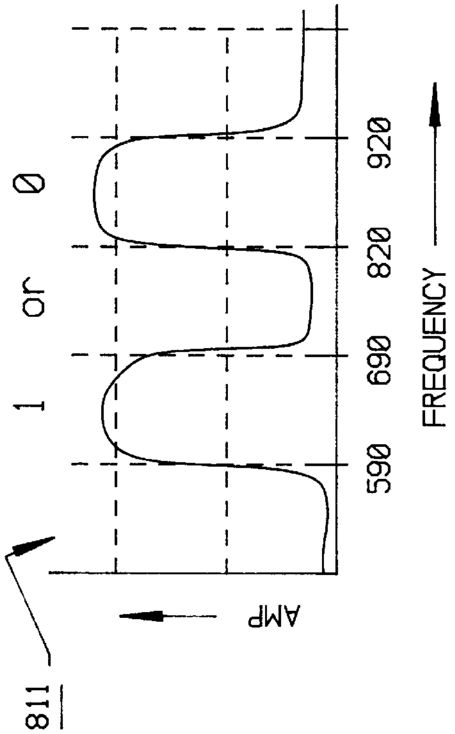
FIGS. 27 and 28 are block diagram representations of an alternative data communication system for the present invention.
Figure 27A:
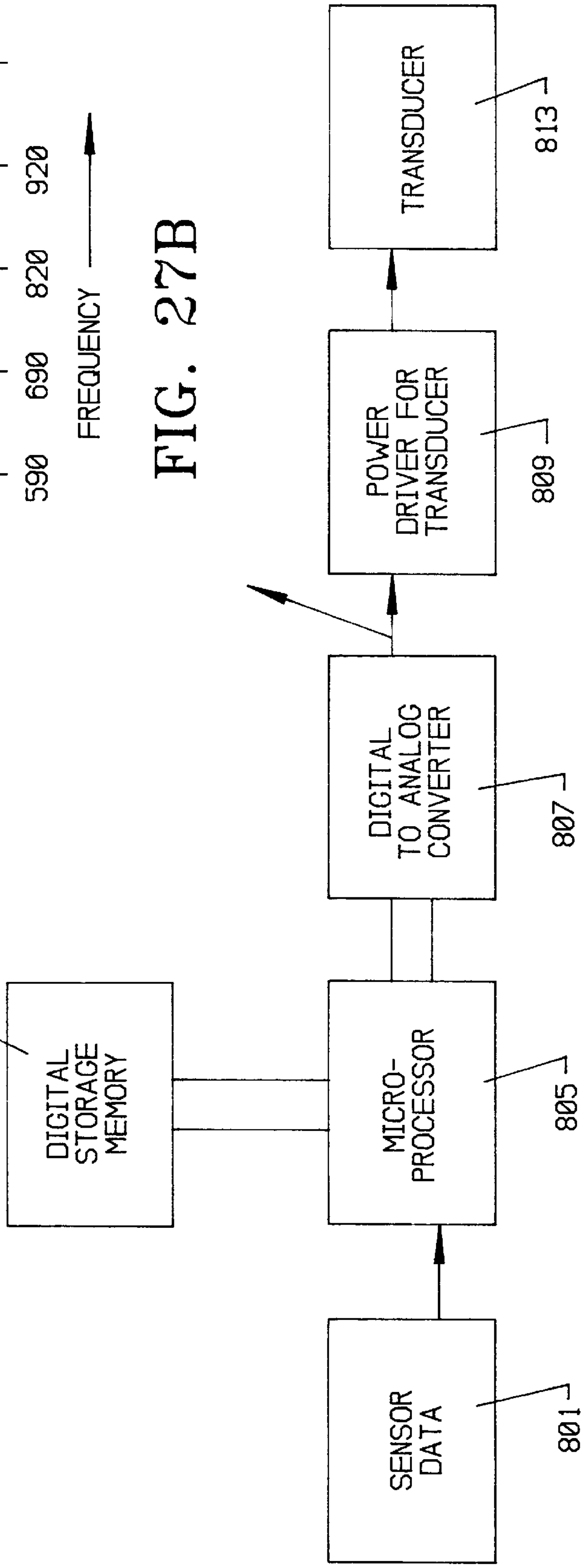
Figure 28:
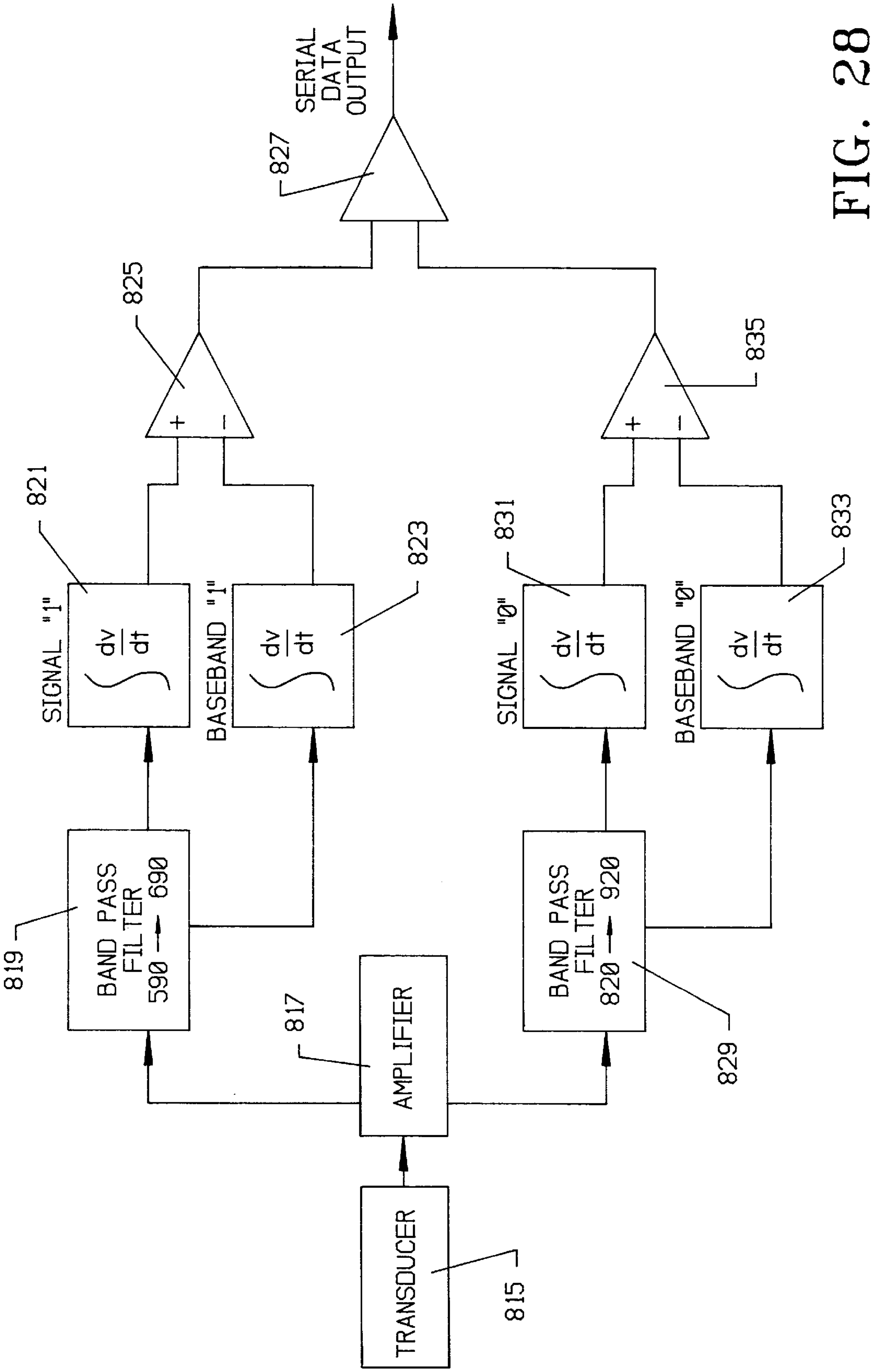

These concepts are illustrated in block diagram form in FIGS. 27 and 28, with FIG. 27 depicting the logic associated with the transmitter, and FIG. 28 depicting the logic associated with the receiver.

Referring first to FIG. 27, sensor data is provided by sensors 801 to microprocessor 805 and digital storage memory 803. When transmission of the data is desired, microprocessor 805 actuates digital-to-analog converter 807 which generates an actuation signal for binary "ones", and an actuation signal for binary "zeroes". Power driver 809 generates a unique power signal associated with each binary zero, and a unique power signal associated with each binary one, as is depicted in graph 811, with a first preselected range of frequencies representing a binary "one", and a second preselected range of frequencies representing a binary "zero". In the example of FIG. 27, frequencies in the range of five hundred ninety to six hundred and ninety Hertz (590–690) are representative of the binary "one", while frequencies in the range of eight hundred and twenty to nine hundred and twenty Hertz (820–920) are representative of the binary "zero". This driving signal is supplied to transducer 813 which is acoustically coupled to the communication channel, which is preferably, but not necessarily, a fluid column within the wellbore.

The acoustic signal is conducted to a remotely located transceiver, such as transducer 815 of FIG. 28. The received acoustic signals are amplified at amplifier 817, and supplied simultaneously to bandpass filter 819 and bandpass filter 829. In the example of FIGS. 27 and 28, bandpass filter 819 is a bandpass filter which allows for the passage of frequencies in the range of five hundred ninety to six hundred and ninety (590–690) Hertz, while bandpass filter 829 allows for the passage of frequencies in the range of eight hundred and twenty Hertz to nine hundred and twenty Hertz (820–920). The outputs of bandpass filters 819, 829 are supplied to subsequent signal processing blocks.

More specifically, the output of bandpass filter 819 is supplied to integrator 821 which provides as an output an indication of the energy content of the signals in the range of frequencies corresponding to the binary "one". Likewise, the output of bandpass filter 829 is supplied to integrator 831 which provides as an output an indication of the energy contained by the signals in the range of frequencies corresponding to the binary "zero". Base band integrator 823 is utilized to provide an indication of the energy level contained within the range of frequencies corresponding to the binary "one" during periods which no signal is present. Likewise, base band integrator 833 is utilized to provide as an output an indication of the energy contained within the frequency band corresponding to the binary "zero" during periods of inactivity. As is shown in FIG. 28, the output of integrator 821 and base band integrator 823 is supplied to summing amplifier 825. Likewise, the output of integrator 831 and base band integrator 833 are supplied to summing amplifier 835.

The output of summing amplifiers 825, 835 are provided to a comparator. If the output of summing amplifier 825 exceeds the output of summing amplifier 835, then the output of comparator 827 is a binary "one"; however, if the output of summing amplifier 835 is greater than the output of summing amplifier 825, then the output of comparator 827 is a binary "zero". In this manner, the binary data provided as an output from microprocessor 805 (of FIG. 27) may be reconstructed at the output of comparator 827 in a remotely located transceiver.

Of course, in the present invention, the transducer which is described herein may be utilized as an acoustic signal generator. Furthermore, the data communication system described herein may be utilized to select the best range of frequencies for representing the binary "one" and the binary "zero".

What is claimed is:

1. In communication in an oil and/or gas system, a method of communicating data between two locations using travel of acoustic waves in a transmission medium, comprising:

(a) characterizing an acoustic channel in said transmission medium by:
   (1) generating a signal in said transmission medium;
   (2) transmitting said signal in said transmission medium; and
   (3) analyzing said signal to identify at least one frequency band adequate for desired communication;
(b) generating an acoustic signal having a frequency within said at least one frequency band;
(c) coupling said acoustic signal to said transmission medium;
(d) receiving said acoustic signal from said transmission medium; and
(e) recovering data from said acoustic signal.

2. A method of transmitting data in an oil and/or gas system between a first communication device at a first communication node and a second communication device at a second communication node through a communication channel defined at least in part by said oil and/or gas system, comprising:

(a) generating a signal at one of said first and second communication nodes;
(b) said signal including a plurality of signal components, each having a signal attribute, with said plurality of signal components presenting a range of signal attributes;
(c) applying said signal to said communication channel;
(d) receiving said signal with one of said first and second wellbore communication devices;
(e) analyzing said signal to identify portions of said range of signal attributes which are suitable for communicating data between said first and second communication nodes; and
(f) communicating data in said communication channel within at least one portion of said range of signal attributes.

3. A method of transmitting data according to claim 2, wherein said oil and/or gas system which at least in part defines said communication channel comprises a fluid column.

4. A method of transmitting data according to claim 2, wherein said oil and/or gas system which at least in part defines said communication channel comprises a wellbore tubular string.

5. A method of transmitting data according to claim 2, further comprising:

(g) continuously generating, applying, receiving, and analyzing said signal to identify portions of said range of signal attributes which are suitable for communicating data between said first and second communication nodes at subsequent times; and
(h) communicating data in said communication channel in at least one selected portion of said range of signal attributes.

6. A method of transmitting data according to claim 1, further comprising:

(g) during said step of communicating data, automatically and periodically generating, applying, receiving, and analyzing said signal to identify portions of said range of signal attributes which are suitable for communicating data between said first and second communication nodes; and
(h) switching between selected portions of said range of signal attributes to optimize communication of data between said first and second communication nodes.

7. A method of transmitting data according to claim 1 wherein, during said step of generating, said signal is generated utilizing a selected one of said first and second communication devices.

8. A method of transmitting data according to claim 1 wherein a plurality of signals are generated at selected ones of said first and second communication nodes, with each being analyzed to identify portions of said range of signal attributes which are suitable for communicating data in a particular direction between said first and second communication nodes.

9. A method of transmitting data according to claim 2 wherein said step of analyzing includes identifying at least one portion of said range of signal attributes which has an adequate bandwidth for communication of data.

10. A method of transmitting data according to claim 2 wherein said step of analyzing includes identifying at least one portion of said range of signal attributes which have an adequate signal to noise characteristic for communication of data.

11. A method of transmitting data according to claim 2 wherein said step of analyzing includes performing a frequency-domain analysis of the received signal.

12. A method of transmitting data according to claim 2 wherein said step of analyzing includes creating a histogram utilizing preselected frequency bins.

13. A method of transmitting data according to claim 5 wherein said step of analyzing includes comparison of coherent running totals to incoherent running totals.

14. A method of transmitting data according to claim 1, further comprising:

(g) synchronizing operation of said first and second communication devices.

15. A method of transmitting data according to claim 1, further comprising:

(g) subsequent to said step of analyzing, transmitting data between said first and second communication devices which identifies at least a center frequency for at least one selected portion of said preselected range of signal attributes.

16. A method of transmitting data according to claim 1:

wherein said communication channel at least in part comprises a dynamic fluid column in said oil and/or gas system; and wherein said method steps of claim 1 are continually performed to optimize data communication in said communication channel, including said dynamic fluid column.

17. A method of transmitting data according to claim 2:

wherein said communication channel at least in part comprises a dynamic fluid column in said wellbore;

wherein mechanical changes in said oil and/or gas system affect acoustic transmission properties of said communication channel; and wherein said steps of claim 2 are performed to automatically optimize data communication in said communication channel, including said dynamic fluid column, notwithstanding said mechanical changes in said oil and/or gas system.

18. An apparatus for transmitting data in an oil and/or gas system between a first communication device at a first communication node and a second communication device at a second communication node through a communication channel defined at least in part by said oil and/or gas system, comprising:

(a) a generator for generating a signal at one of said first and second communication nodes for said signal including a plurality of signal components, each having a signal attribute, with said plurality of signal components presenting a range of signal attributes;

(b) a transducer for applying said signal in the form of an acoustic signal to said communication channel;

(c) a receiver for receiving said acoustic signal with one of said first and second wellbore communication devices;

(d) an analyzer for analyzing said acoustic signal to identify portions of said range of signal attributes which are suitable for communicating data between said first and second communication nodes; and (e) a communication member for communicating data in said communication channel within at least one portion of said range of signal attributes.

19. An apparatus for transmitting data according to claim 18, wherein said oil and/or gas system which at least in part defines said communication channel comprises a fluid column.

20. An apparatus for transmitting data according to claim 18, wherein said oil and/or gas system which at least in part defines said communication channel comprises a wellbore tubular string.

21. An apparatus for transmitting data according to claim 18, further comprising:

(f) a processor for continuously generating, applying, receiving, and analyzing said signal to identify portions of said range of signal attributes which are suitable for communicating data between said first and second communication nodes at subsequent times; and (g) wherein said communication member operates by communicating data in said communication channel in at least one selected portion of said range of signal attributes.

22. An apparatus for transmitting data according to claim 18, further comprising:

(f) at least one processor for automatically and periodically generating, applying, receiving, and analyzing said signal to identify portions of said range of signal attributes which are suitable for communicating data between said first and second communication nodes; and (g) wherein said communication member operates by switching between selected portions of said range of signal attributes to optimize communication of data between said first and second communication nodes.

23. An apparatus for transmitting data according to claim 18, further comprising:

(f) a synchronization member for synchronizing operation of said first and second communication devices.

24. An acoustic communication apparatus in an oil and/or gas system for communication through a communication channel for acoustic communication between a first communication node and a second communication node, comprising:

(a) a first actuator member for conversion of at least one of (a) a provided coded signal to a corresponding generated coded acoustic signal during a message transmission mode of operation, and (b) a provided coded acoustic signal to a corresponding generated coded signal during a message reception mode of operation;

(b) a second actuator member for conversion of at least one of at least one of (a) a provided coded signal to a corresponding generated coded acoustic signal during a message transmission mode of operation, and (b) a provided coded acoustic signal to a corresponding generated coded signal during a message reception mode of operation;

(c) housings for securing said first and second actuator members in selected locations within said oil and/or gas system; and (d) wherein said acoustic communication apparatus is operable in a plurality of modes of operation including at least:

(1) a communication channel characterization mode of operation wherein a characterization signal is transmitted in said communication channel and then analyzed to identify at least one communication frequency for optimal communication; and (2) a data communication mode of operation, wherein data is transmitted between said first and second communication nodes through operation of said first and second actuator members at said at least one communication frequency.

25. An acoustic communication apparatus according to claim 24 wherein said acoustic communication apparatus is utilized to communicate data within said oil and/or gas system during drilling operations.

26. An acoustic communication apparatus according to claim 24 wherein said acoustic communication apparatus is utilized to communicate data in said oil and/or gas system during completion operations.

27. An acoustic communication apparatus according to claim 24 wherein said acoustic communication apparatus is utilized to communicate data in said oil and/or gas system during production operations.

28. An acoustic communication apparatus according to claim 24, wherein said communication apparatus is further operable in:

(3) a monitoring mode of operation wherein said communication channel characterization mode is performed during said data communication operation.

29. An acoustic communication apparatus for use during drilling operations in a wellbore having a drillstring disposed therein composed of a drill pipe section and a drill collar section, with a communication channel for acoustic communication between a first communication node and a second communication node, comprising:

(a) a first actuator member located at said first communication node for conversion of at least one of (a) a provided coded signal to a corresponding generated coded acoustic signal during a message transmission mode of operation, and (b) a provided coded acoustic signal to a corresponding generated coded signal during a message reception mode of operation;

(b) a second actuator member located at said second communication node for conversion of at least one of at least one of (a) a provided coded signal to a corresponding generated coded acoustic signal during a message transmission mode of operation, and (b) a provided coded acoustic signal to a corresponding generated coded signal during a message reception mode of operation;

(c) housings for securing said first and second actuator members in selected locations within said wellbore; and (d) wherein said acoustic communication apparatus is operable in a plurality of modes of operation including at least:

(1) a communication channel characterization mode of operation wherein a characterization signal is transmitted in said communication channel and then analyzed to identify at least one communication frequency for optimal communication; and (2) a data communication mode of operation, wherein data is transmitted between said first and second communication nodes through operation of said first and second actuator members at said at least one communication frequency.

30. An acoustic communication apparatus according to claim 29:

wherein said first communication node is located in said drill collar section of said drillstring;

wherein said second communication node is located in said drillstring upward from said first communication node;

wherein said first actuator member is utilized to transmit data pertaining to at least one of (a) drillstring operations, (b) wellbore conditions, and (c) formation conditions to said second actuator member.

31. An acoustic communication apparatus according to claim 30:

wherein said data received by said second actuator member is supplied to a measurement-while-drilling data transmission system for at least one of (a) processing and (b) retransmission.

32. An acoustic communication apparatus according to claim 30:

wherein said second communication node is located at a wellhead for said wellbore; and wherein said first actuator member is utilized to transmit data to said wellhead.

33. An acoustic communication apparatus according to claim 32:

wherein said first actuator member is utilized to transmit data to said wellhead in parallel with a measurement-while-drilling data transmission system.

34. An acoustic communication apparatus according to claim 29:

wherein said first communication node is located in said drill collar section of said drillstring adjacent a drill bit;

wherein said second communication node is located in said drill collar section of said drillstring above said first communication node, adjacent a measurement-while-drilling data transmission system; and wherein data pertaining to near-drillbit conditions is transmitted from said first communication node to said second communication node.

35. In borehole communication, a method of preparing for communicating data between two locations, at least one of which is within a borehole, using travel of acoustic waves in a transmission medium which extends at least in part into a downhole location, comprising:

(a) generating a first synchronizing signal at a first location;

(b) acoustically transmitting said first synchronizing signal through said transmission medium at a second location;

(c) receiving said synchronizing signal at said second location;

(d) synchronizing said signal between said first and second locations;

(e) generating a second synchronizing signal in said second location;

(f) acoustically transmitting said synchronizing signal through said transmission medium to said first location;

(g) receiving said synchronizing signal at said second location; and (h) synchronizing said signal between said first and second locations.

36. In borehole communication, a method of communicating data between two locations using travel of acoustic waves in a communication channel, comprising the steps of:

(a) synchronizing a first device at a first location with a second device at a second location by:

(1) generating a synchronizing signal;

(2) acoustically transmitting said synchronizing signal through said communication channel to said second device;

(3) receiving said synchronizing signal at said second device;

(4) approximately synchronizing said second device with said first device based upon the received synchronizing signal;

(5) generating a second synchronizing signal in said second device;

(6) acoustically transmitting said second synchronizing signal through said communication channel to said second device;

(7) receiving said second synchronizing signal at said second device; and (8) synchronizing said first device with said second device based upon the received second synchronizing signal;

(b) after synchronization is complete, sending data between said first and second devices.

37. In borehole communication, a method of communicating data between two locations using acoustic waves in at least one transmission medium extending at least in part in said borehole, including the steps of:

(a) periodically characterizing a dynamically varying number of acoustic channels with dynamically variable channel attributes in said at least one transmission medium to determine a preferred transmission frequency for communication of said data;

(b) synchronizing a first communication device and a second communication device; and (C) bi-directionally transferring data between said first and second communication devices.

38. A method of detecting an influx into a wellbore utilizing a communication channel in said wellbore, comprising:

(a) generating an interrogating signal at a selected location within said wellbore;

(b) applying said interrogating signal to said communication channel;

(c) receiving said interrogating signal;

(d) analyzing said interrogating signal to identify at least one of:

(1) communication channel attributes; and (2) signal attributes;

(e) repeating said steps of generating, applying, receiving, and analyzing to identify changes in at least one of:

(1) communication channel attributes; and (2) signal attributes; which correspond to an influx in said wellbore.

39. A method according to claim 38:

wherein said communication channel attributes include at least one of:

(1) communication channel length; and (2) communication channel impedance.

40. A method according to claim 38:

wherein said signal attributes include at least one of:

(1) signal amplitude;

(2) signal phase;

(3) loss of signal; and (4) signal time delay.

41. An apparatus for detecting an influx into a wellbore utilizing a communication channel, comprising:

(a) a signal generator for generating an interrogating signal at a selected location within said wellbore and applying said interrogating signal to said communication channel;

(b) a signal receiver for receiving said interrogating signal;

(c) an analyzer for analyzing said interrogating signal to identify at least one of:

(1) communication channel attributes; and (2) signal attributes;

(d) a processor for repeating said steps of generating, applying, receiving, and analyzing to identify changes in at least one of:

(1) communication channel attributes; and (2) signal attributes; which correspond to an influx in said wellbore.

42. An apparatus according to claim 41:

wherein said communication channel attributes include at least one of:

(1) communication channel length; and (2) communication channel impedance.

43. An apparatus according to claim 41:

wherein said signal attributes include at least one of:

(1) signal amplitude;

(2) signal phase;

(3) loss of signal; and (4) signal time delay.

* * * * *